(12) United States Patent
Haro

(10) Patent No.: US 12,229,912 B2
(45) Date of Patent: *Feb. 18, 2025

(54) IMAGE ANALYSIS AND GAZE REDIRECTION USING CHARACTERISTICS OF THE EYE

(71) Applicant: Kickback Space Inc., Carlsbad, CA (US)

(72) Inventor: Rocco Haro, Carlsbad, CA (US)

(73) Assignee: Kickback Space Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,189

(22) Filed: Jan. 4, 2024

(65) Prior Publication Data

US 2024/0221334 A1    Jul. 4, 2024

Related U.S. Application Data

(63) Continuation of application No. 18/319,837, filed on May 18, 2023, now abandoned, which is a continuation of application No. 17/903,629, filed on Sep. 6, 2022, now Pat. No. 11,694,419.

(60) Provisional application No. 63/260,930, filed on Sep. 6, 2021.

(51) Int. Cl.
  *G06T 19/20*      (2011.01)
  *G06F 3/01*       (2006.01)

(52) U.S. Cl.
  CPC .............. *G06T 19/20* (2013.01); *G06F 3/013* (2013.01); *G06T 2219/2004* (2013.01)

(58) Field of Classification Search
  None
  See application file for complete search history.

(56) References Cited

U.S. PATENT DOCUMENTS

| 5,347,306 A | 9/1994 | Nitta |
| 8,571,871 B1 | 10/2013 | Stuttle et al. |
| 8,581,956 B2 | 11/2013 | Robinson et al. |

(Continued)

FOREIGN PATENT DOCUMENTS

| EP | 3951604 A1 | 2/2022 |
| WO | WO-2020203999 A1 | 10/2020 |

(Continued)

OTHER PUBLICATIONS

International Preliminary Report on Patentability for International Application No. PCT/US2022/079699 mailed May 23, 2024, 7 pages.

(Continued)

*Primary Examiner* — Ryan M Gray
(74) *Attorney, Agent, or Firm* — COOLEY LLP

(57) ABSTRACT

In a method for performing gaze redirection, a video stream of a user is received, each video frame from the video stream including a depiction of a gaze of the user. For each video frame from the video stream, an estimated gaze direction of the gaze of the user in that video frame is determined. A field of view (FOV) for a virtual representation associated with the user in a virtual environment is determined. An updated video frame including a modified gaze direction of the user different from the estimated gaze direction of the gaze of the user is generated.

20 Claims, 24 Drawing Sheets

(56) References Cited

U.S. PATENT DOCUMENTS

| | | | |
|---|---|---|---|
| 10,554,921 B1* | 2/2020 | Lim | H04N 7/144 |
| 10,628,931 B1 | 4/2020 | Ramos et al. | |
| 10,803,646 B1* | 10/2020 | Bogan, III | G06V 10/82 |
| 10,952,006 B1 | 3/2021 | Krol et al. | |
| 10,979,672 B1 | 4/2021 | Krol et al. | |
| 11,070,768 B1 | 7/2021 | Krol et al. | |
| 11,076,128 B1 | 7/2021 | Krol et al. | |
| 11,095,857 B1 | 8/2021 | Krol et al. | |
| 11,140,361 B1 | 10/2021 | Krol et al. | |
| 11,170,521 B1* | 11/2021 | Ben Himane | G06T 19/20 |
| 11,184,362 B1 | 11/2021 | Krol et al. | |
| 11,290,688 B1 | 3/2022 | Krol et al. | |
| 11,488,364 B2 | 11/2022 | Valli et al. | |
| 11,568,646 B2 | 1/2023 | Haro | |
| 11,694,419 B2* | 7/2023 | Haro | H04N 7/157 |
| | | | 345/619 |
| 2009/0033737 A1 | 2/2009 | Goose et al. | |
| 2010/0315482 A1 | 12/2010 | Rosenfeld et al. | |
| 2013/0271560 A1 | 10/2013 | Diao | |
| 2014/0040783 A1 | 2/2014 | Goldman et al. | |
| 2014/0247319 A1 | 9/2014 | Anderson et al. | |
| 2016/0300387 A1 | 10/2016 | Ziman | |
| 2017/0171261 A1 | 6/2017 | Smus | |
| 2017/0374486 A1 | 12/2017 | Killham et al. | |
| 2018/0034867 A1 | 2/2018 | Zahn et al. | |
| 2019/0266701 A1 | 8/2019 | Isikdogan et al. | |
| 2019/0318730 A1 | 10/2019 | Hazarika et al. | |
| 2020/0209957 A1 | 7/2020 | Sztuk et al. | |
| 2020/0294317 A1 | 9/2020 | Segal | |
| 2020/0322395 A1 | 10/2020 | Copley et al. | |
| 2020/0322575 A1* | 10/2020 | Valli | G03B 21/00 |
| 2022/0197588 A1 | 6/2022 | Lei et al. | |
| 2022/0207667 A1* | 6/2022 | Huang | G06V 40/171 |
| 2022/0215504 A1 | 7/2022 | Moens | |
| 2022/0277565 A1 | 9/2022 | Haro | |
| 2022/0286314 A1* | 9/2022 | Meyer | H04N 7/147 |
| 2023/0083909 A1 | 3/2023 | Haro | |
| 2023/0123005 A1 | 4/2023 | Haro | |
| 2023/0146178 A1 | 5/2023 | Haro | |
| 2024/0312212 A1 | 9/2024 | Haro | |

FOREIGN PATENT DOCUMENTS

| | | |
|---|---|---|
| WO | WO-2022183119 A1 | 9/2022 |
| WO | WO-2023035007 A1 | 3/2023 |
| WO | WO-2023086926 A1 | 5/2023 |

OTHER PUBLICATIONS

Laskowski K et al., "Detection of Laughter-in-Interaction in Multichannel Close-Talk Microphone Recordings of Meetings," Advances in visual computing, 16th International symposium, Jan. 2008, pp. 149-160.

Ahrens and Spors "A Modal Analysis of Spatial Discretization of Spherical Loudspeaker Distributions Used for Sound Field Synthesis", IEEE Transactions on Audio, Speech, and Language Processing, Nov. 2012, 20(9), p. 2564-2574.

Alam et al. "Sparse Simultaneous Recurrent Deep Learning for Robust Facial Expression Recognition", IEEE Transactions on Neural Networks and Learning Systems, 2018, 12 pages.

Baek Eu-Tteum, et al., "Gaze correction using feature-based view morphing and performance evaluation." Signal, Image and Video Processing 11 (2017): 187-194.

Bansal, A., Ma, S., Ramanan, D. and Sheikh, Y., 2018. Recycle-gan: Unsupervised video retargeting. In Proceedings of the u European conference on computer vision (ECCV) (pp. 119-135).

Brummer "Composition and Perception in Spatial Audio", Computer Music Journal, Spring 2017, 41(1), p. 46-60.

Bruno et al. "From 3D reconstruction to virtual reality: A complete methodology for digital archaeological exhibition", Journal of Cultural Heritage, 2010, vol. 11, p. 42-49.

Cabrera et al. "The Evolution of Spatial Audio in the AlloSphere", Computer Music Journal, Winter 2016, 40(4), p. 47-61.

Caroppo et al. "Comparison Between Deep Learning Models and Traditional Machine Learning Approaches for Facial Expression Recognition in Ageing Adults", Journal of Computer Science and Technology, 2020, vol. 35, No. 5, p. 1127-1146.

Clark M. "Amid the Fluff, Meta showed an impressive demo of its Codec Avatars", The Verge, 2021, 7 pages. Retrieved online: https://www.theverge.com/2021/10/28/22751177/facebook-meta-codec-avatar-real-time-environmentrendering-neural-interface.

Clubhouse (app), Wikipedia, 2022, 13 pages.

Cobos et al. "SART3D: A Matlab toolbox for spatial audio and signal processing education", Comput Appl Eng Educ. 2019, p. 1-15.

Coleman et al. "Object-Based Reverberation for Spatial Audio", Journal of the Audio Engineering Society, vol. 65, No. 1/2, Jan./Feb. 2017, p. 66-77.

Conetta et al. "Spatial Audio Quality Perception (Part 1): Impact of Commonly Encountered Processes", J. Audio Eng. Soc., Dec. 2014, 62(12) 831-846.

Conetta et al. "Spatial Audio Quality Perception (Part 2): A Linear Regression Model", J. Audio Eng. Soc., Dec. 2014, 62(12) 847-860.

Drummond et al. "Object-based attention: Shifting or uncertainty?", Attention, Perception, & Psychophysics, 2010, 72 (7), p. 1743-1755.

Gemmell, Jim et al. "Gaze Awareness for Video-conferencing: A Software Approach", IEEE Multimedia, IEEE Service Center, New York, NY, US, vol. 7, No. 4, Oct. 1, 2000, pp. 26-35.

Gierlich "The Application of Binaural Technology", Applied Acoustics 1992, 36, p. 219-243.

Hacihabiboglu et al. "An overview of spatial-audio techniques based on psychoacoustics", Perceptual Spatial Audio Recording, Simulation, and Rendering, IEEE Signal Processing Magazine, May 2017, p. 36-54.

Hendrickx, Paquier and Koehl "Audiovisual Spatial Coherence for 2D and Stereoscopic-3D Movies", Journal of the Audio Engineering Society, Nov. 2015, 63(11), p. 889-899.

Hong et al. "Spatial Audio for Soundscape Design: Recording and Reproduction", Applied Sciences 2017, 7(627), 22 pages.

International Preliminary Report on Patentability for International Application No. PCT/US2022/018186 dated Sep. 7, 2023, 16 pages.

International Search Report and Written Opinion for International Application No. PCT/US2022/018186 dated Jun. 24, 2022, 22 pages.

International Search Report and Written Opinion for International Application No. PCT/US2022/075971 dated Dec. 7, 2022, 16 Pages.

Katz et al. "Perceptual evaluation of multi-dimensional spatial audio reproduction", J. Acoust. Soc. Am. 116 (2), Aug. 2004, p. 1105-1115.

Kauff et al. "An Immersive 3D Video-Conferencing System Using Shared Virtual Team User Environments", Conference Paper, Jan. 2020, 9 pages.

Kendall "The Decorrelation of Audio Signals and Its Impact on Spatial Imagery", Center for Music Technology School of Music, Computer Music Journal, vol. 19, No. 4 Winter, 1995, 19(4), p. 71-87.

Lee et al. "Efficient video coding based on audio-visual focus of attention", J. Vis. Commun. Image R., 2011, 22, p. 704-711.

Lee et al. "Optimising the learning process with immersive virtual reality and non-immersive virtual reality in an educational environment", Int. J. Mobile Learning and Organisation, 2020, vol. 14, No. 1, p. 21-35.

Li et al. "Attention-Based LSTM Algorithm for Audio Replay Detection in Noisy Environments", Applied Sciences 2019, 9, 1539, 15 pages.

Lin et al. "Robust High-Resolution Video Matting with Temporal Guidance", Proceedings of the IEEE, 2021, 14 pages.

Lopez et al. "Effects and applications of spatial acuity in advanced spatial audio reproduction systems with loudspeakers", Applied Acoustics (2020) 161, 107179-107186.

(56) References Cited

OTHER PUBLICATIONS

Menzies et al. "Decoding and Compression of Channel and Scene Objects for Spatial Audio", IEEE/ACM Transactions on Audio, Speech, and Language Processing, Nov. 2017, 25(11), p. 2138-2151.
Moller H. "Fundamentals of Binaural Technology", Applied Acoustics, 1992, 36, p. 171-218.
Moon et al. "An Improved Early Detection Algorithm for All-Zero Blocks in H.264 Video Encoding", IEEE Transactions on Circuits and Systems for Video Technology, 2005, vol. 15, No. 8, p. 1053-1057.
Narayanan, R. et al. "Multiparty gaze preservation through perspective switching for interactive elearning environments." Multimedia Tools and Applications 78 (2019): 17461-17494.
Narbutt et al. "Ambiqual: Towards a Quality Metrics for Headphone Rendered Compressed Ambisonic Spatial Audio", Applied Sciences, 2020, 10, 3188, 21 pages.
Nishimura "Audio Watermarking Using Spatial Masking and Ambisonics", IEEE Transactions on Audio, Speech, and Language Processing, Nov. 2012, 20(9), p. 2461-2469.
Pedersen et al. "Spatialized Audio in a Custom-Built OpenGL-Based Ear Training Virtual Environment", Theme Article: Collaborating and Learning in Shared Virtual Environments, IEEE Computer Society, Aug. 2020, p. 67-81.
Porschmann et al. "Directional Equalization of Sparse Head-Related Transfer Function Sets for Spatial Upsampling", IEEE/ACM Transactions on Audio, Speech and Language Processing, Jun. 2019, 27(6), p. 1060-1071.
Pulkki et al. "Spatial Perception of Sound Source Distribution in the Median Plane", J. Audio Eng. Soc., Nov. 2019, vol. 67(11), p. 855-870.
Santos C. "VR audio terms: Gaze Activation v. Focus", Randi Altman's Post Perspective, 32nd Conference on Neural Information Processing Systems (NeurIPS 2018), Montreal, Canada, 2022, 3 pages, Retrieved online: https://postperspective.com/vr-audio-terms-gaze-activation-v-focus/.
Schoeffler et al. "Evaluation of Spatial/3D Audio: Basic Audio Quality vs. Quality of Experience", Journal of Latex Class Files, Aug. 2015, 14(8), 14 pages.
Talagala et al. "Binaural sound source localization using the frequency diversity of the head-related transfer function", J. Acoust. Soc. Am. 135 (3), Mar. 2014, p. 1207-1217.
Uberti et al. "Enhancing conversation swith spatial audio", Technically Speaking, Clubhouse, 2022, 8 pages. Retrieved online:https://blog.clubhouse.com/enhancing-conversations-with-spatial-audio/#:~:text=Spatial audio is a newer, easier to follow the conversation.
Wood et al. "A 3D morphable eye region model for gaze estimation", European Conference on Computer Vision; Computer Vision—ECCV 2016, p. 297-313.
Wood et al. "GazeDirector: Fully Articulated Eye Gaze Redirection in Video", Eurographics, 2018, 37(2), p. 217-225.
Xu et al. "Reinforced Continual Learning", 32nd Conference on Neural Information Processing Systems (NeurIPS 2018), Montréal, Canada, 2018, 10 pages.
Yao et al. "Binaural rendering technology over loudspeakers and headphones", Acoust. Sci. & Tech. 2020, 41(1), p. 134-141.
Zhang et al. "Modeling of Individual HRTFs Based on Spatial Principal Component Analysis", IEEE/ACM Transactions on Audio, Speech, and Language Processing, 2020, 28, p. 785-797.
Zhenyi He et al. "Who is Looking at Whom? Visualizing Gaze Awareness for Remote Small-Group Conversations", arxiv.org, Cornell University Library, ACM, New York, NY, Jul. 2021, 24 pages.
Zielinski et al. "Automatic Spatial Audio Scene Classification in Binaural Recordings of Music", Appl. Sci. 2019, 9, 1724, 22 pages.
International Search Report and Written Opinion for International Application No. PCT/US2022/079699, by Kickback Space Inc., mailed Mar. 2, 2023; 10 pages.
Non-Final Office Action for U.S. Appl. No. 18/054,590, by Haro, mailed Mar. 23, 2023; 10 pages.
Non-Final Office Action for U.S. Appl. No. 18/069,643, by Haro, mailed Aug. 23, 2023; 16 pages.
Notice of Allowance for U.S. Appl. No. 17/682,910, by Haro, mailed Sep. 13, 2022; 8 pages.
Notice of Allowance for U.S. Appl. No. 17/903,629, by Haro, mailed Mar. 15, 2023; 2 pages.
Notice of Allowance for U.S. Appl. No. 17/903,629, by Haro, mailed Feb. 21, 2023; 9 pages.

\* cited by examiner

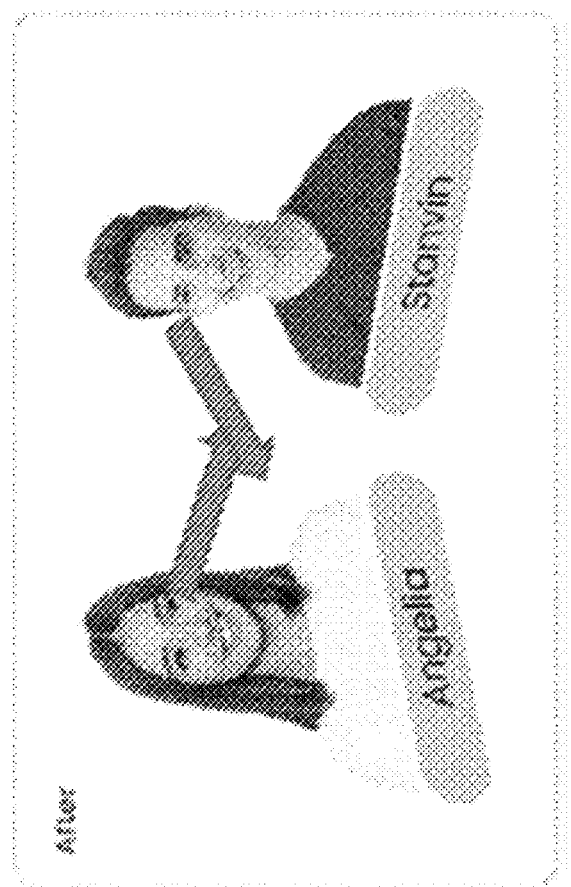
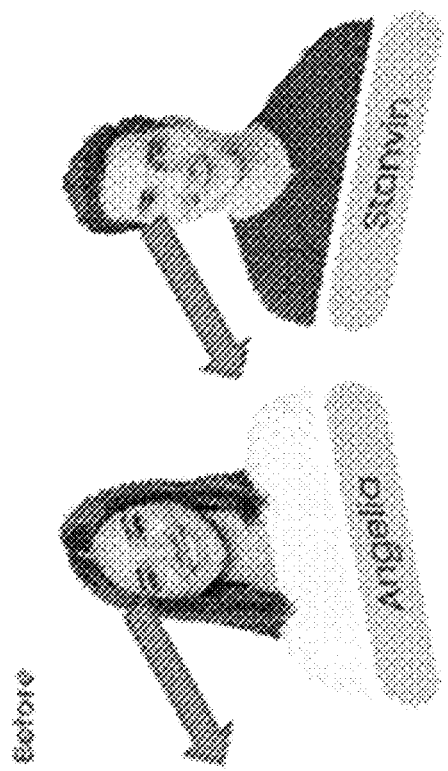
FIG. 3

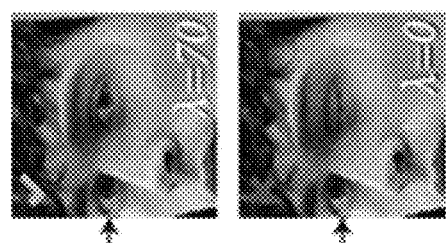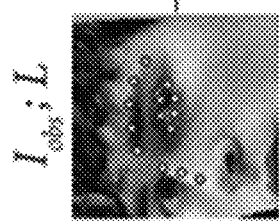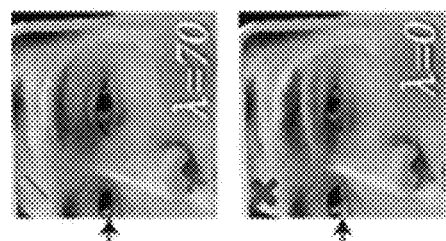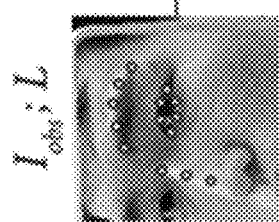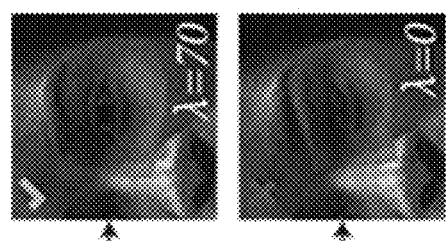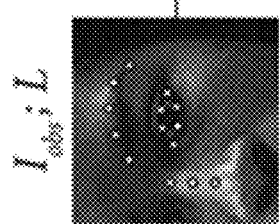
FIG. 8

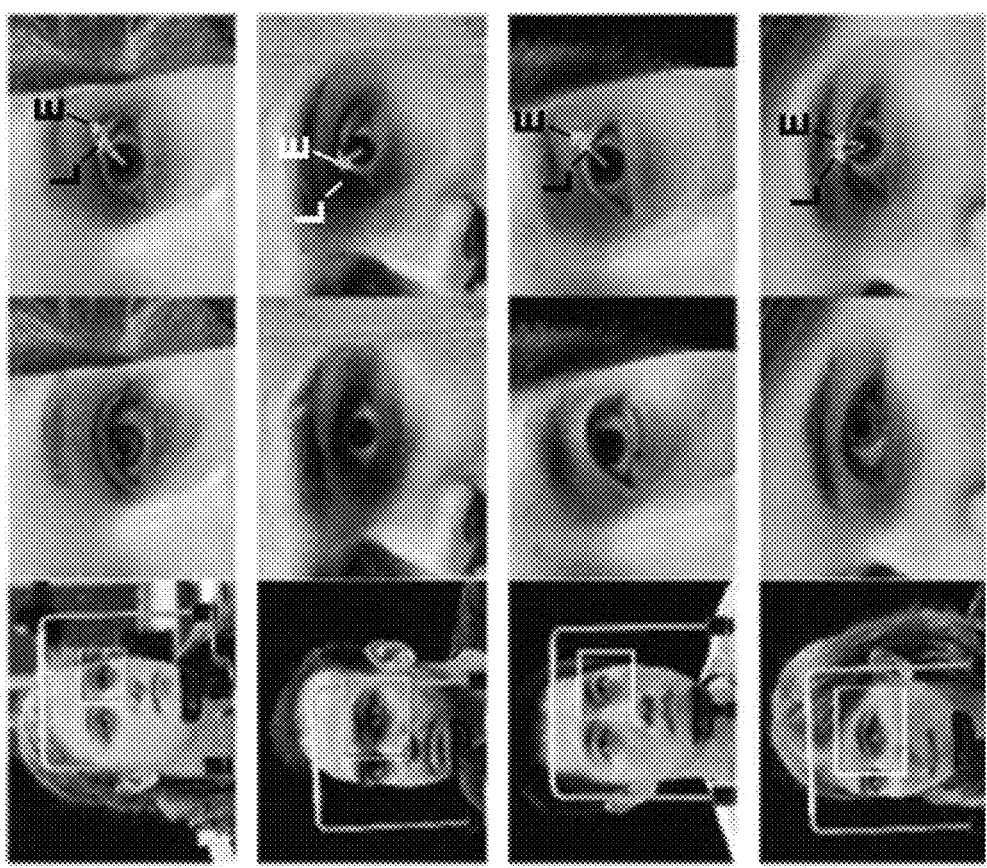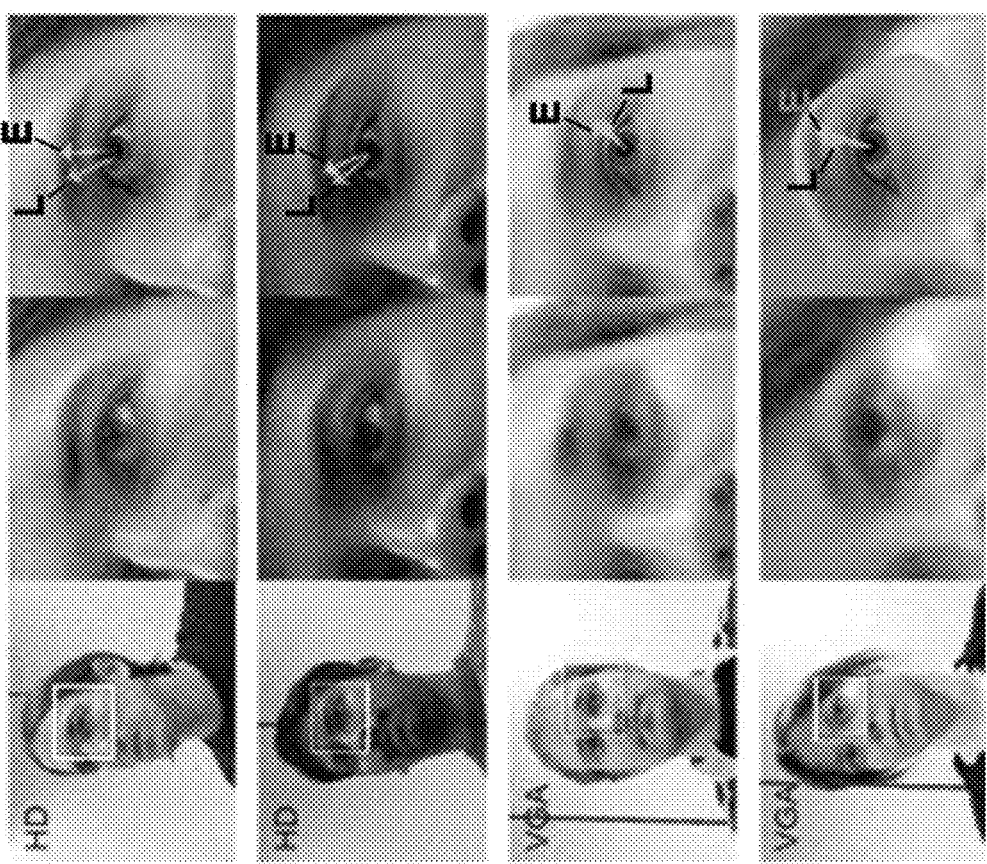
FIG. 9

Eye Gaze Adjustment System Flow

Example of System Components in Action
- ### Basic Calibration Example
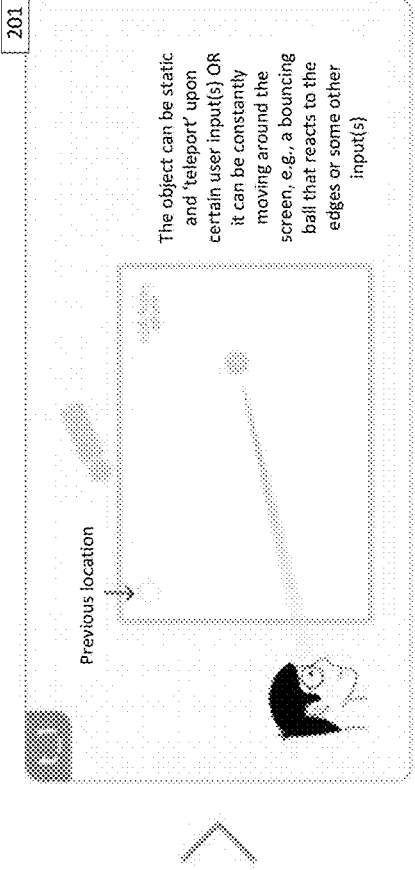
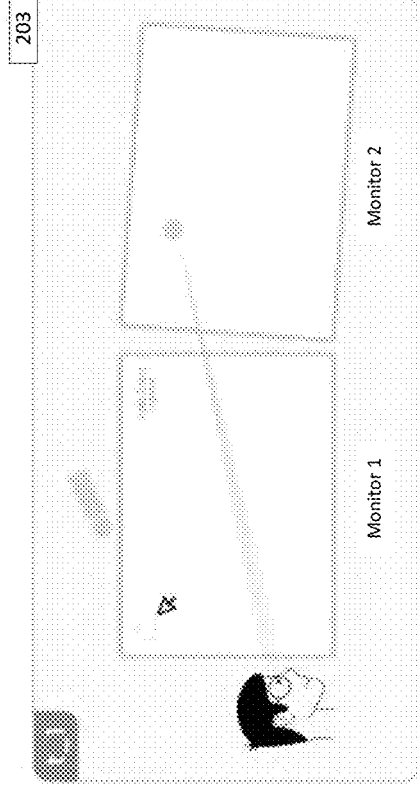
- ### Multi screen Calibration Example
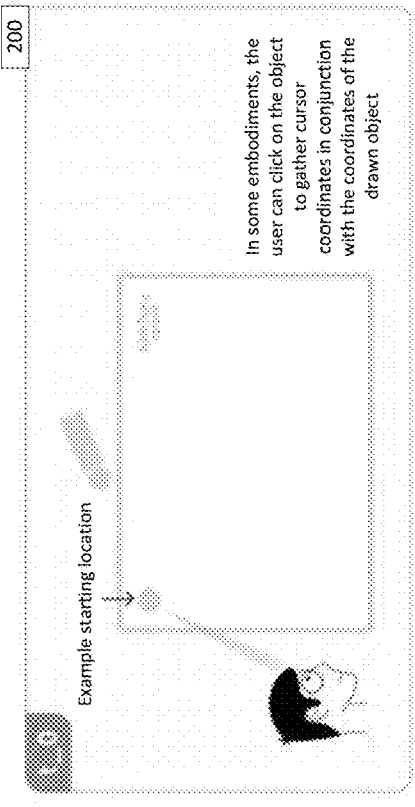
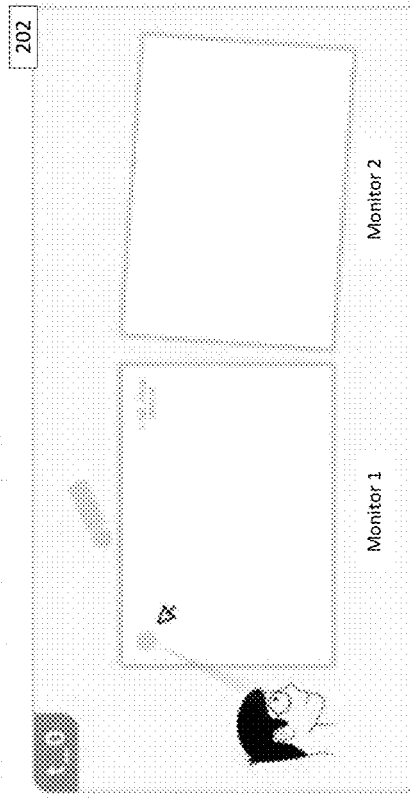
In some embodiments the user can calibrate over N screens, regardless of their orientation
FIG. 14

Receive, at a first compute device and from a second compute device, a signal representing a first video frame of a first user captured at a first time 901

Estimate a first gaze direction of the first user in the first video frame 902

Determine a first field of view of a first virtual representation of the first user in a virtual environment, the first virtual representation based on an appearance of the first user, the first field of view including a second virtual representation included in the virtual environment and not including a third virtual representation (e.g., of another user or an object) included in the virtual environment 903

Determine that the first gaze direction at least partially overlaps with the first field of view 904

Generate a second video frame that shows the first virtual representation looking at the second virtual representation and not looking at the third virtual representation 905

Send, at a second time subsequent to the first time, the second video frame to a third compute device to cause the third compute device to display the second video frame within the virtual environment 906

Receive, at the first compute device and from the second compute device, a signal representing a third video frame of the first user captured at a third time 907

Continuing at FIG. 19B

Continuing from FIG. 19A

Estimate a second gaze direction of the first user in the second video frame 908

Determine a second field of view of a first virtual representation in the virtual environment, the second field of view including the third virtual representation and not the second virtual representation 909

Determine that the second gaze direction at least partially overlaps with the second field of view 910

Generating a fourth video frame that shows the first virtual representation looking at the third virtual representation and not the second virtual representation 911

Sending, at a fourth time subsequent to the third time, the fourth video frame to the third compute device to cause the third compute device to display the fourth video frame within the virtual environment 912

Receive a video stream of a user, each video frame from the video stream including a depiction of a gaze of the user 1001

For each video frame from the video stream

Determine, substantially in real time as that video frame is received, an estimated gaze direction of the gaze of the user in that video frame 1002

↓

Determine a field of view for a virtual representation associated with the user in a virtual environment 1003

↓

Compare the field of view for the virtual representation associated with the user to the estimated gaze direction of the gaze of the user to determine whether the field of view for the virtual representation associated with the user at least partially overlaps with the estimated gaze direction of the gaze of the user 1004

↓

Generate an updated video frame including a modified gaze direction of the user different from the estimated gaze direction of the gaze of the user 1005

↓

Cause the updated video frame to be displayed 1006
```

FIG. 20

IMAGE ANALYSIS AND GAZE REDIRECTION USING CHARACTERISTICS OF THE EYE

CROSS-REFERENCE TO RELATED APPLICATIONS

This application is a continuation of U.S. patent application Ser. No. 18/319,837, filed May 18, 2023, which is a continuation of U.S. patent application Ser. No. 17/903,629, filed Sep. 6, 2022, now U.S. Pat. No. 11,694,419, which claims priority to and the benefit of U.S. Provisional Patent Application No. 63/260,930, filed Sep. 6, 2021 and titled "EYE GAZE ADJUSTMENT BASED ON ATTENTION," the contents of which are incorporated by reference herein in their entireties.

FIELD

One or more embodiments are related to image analysis and gaze redirection using eye characteristics.

BACKGROUND

Proponents of business communications and etiquette practitioners, soft skills trainers, socialites and even the general public have been aware of the role of eye contact in human communication. Avoiding eye contact can be perceived to be a show of disgrace or a personal avoidance in many cultures. Other than the social connotations, eye contact also signifies sincerity, focus, connection, truthfulness, earnestness, and respect.

When humans engage in conversation in person, they may make eye contact to show other people that their attention is on them. In group contexts, people may use their eyes to shift the focus of attention onto other members who are not actively speaking. This visual cue is an embedded piece of our human nature, yet known video conferencing technologies at least partially strip this communication tool.

SUMMARY

In an embodiment, a method for performing gaze redirection includes receiving, via a processor of a first compute device and from a second compute device, a signal representing eye data associated with at least one eye of a first user. The method further includes determining, via the processor and in response to receiving the signal representing the eye data, that the eye data is sufficient to perform gaze direction correction for the first user. The method further includes sending, via the processor and to the second compute device, a signal indicating that the eye data is sufficient to perform the gaze direction correction. The method further includes receiving, via the processor and from the second compute device, a signal representing a first video frame of the first user. The method further includes estimating, via the processor and using the eye data, a gaze direction of the first user in the first video frame. The method further includes determining, via the processor, a field of view of a first virtual representation of the first user in a virtual environment, the first virtual representation (1) based on an appearance of the first user and (2) controllable by the first user. The method further includes comparing, via the processor, the gaze direction of the first user in the first video frame and the field of view of the first virtual representation, to predict a target gaze direction for the first user. The method further includes inputting, via the processor, representations of the first video frame, the gaze direction of the first user, the target gaze direction, and a normalizing factor into a processing pipeline to generate a second video frame, a gaze direction of the first virtual representation in the second video frame being different from the gaze direction of the first user in the first video frame. The method further includes generating, via the processor and using the second video frame, a modified video frame that represents the first virtual representation from a perspective of a second virtual representation in the virtual environment. The method further includes causing, via the processor, the modified video frame to be displayed in the virtual environment, at a third compute device, and to a second user associated with the second virtual representation.

In an embodiment, an apparatus includes a memory and a processor operatively coupled to the memory. The processor is configured to receive, at a first compute device and from a second compute device, a signal representing a first video frame of a first user captured at a first time. The processor is further configured to estimate a first gaze direction of the first user in the first video frame. The processor is further configured to determine a first field of view of a first virtual representation of the first user in a virtual environment. The first virtual representation is based on an appearance of the first use. The first field of view includes a second virtual representation (e.g., of a second user or of an object or other feature) included in the virtual environment and does not include a third virtual representation of a third user included in the virtual environment. The processor is optionally further configured to determine that the first gaze direction at least partially overlaps with the first field of view. The processor is further configured to generate (optionally in response to determining that the first gaze direction at least partially overlaps with the first field of view) a second video frame that shows the first virtual representation looking at the second virtual representation and not looking at the third virtual representation. The processor is further configured to send, at a second time subsequent to the first time, the second video frame to a third compute device to cause the third compute device to display the second video frame within the virtual environment. The processor is further configured to receive, at the first compute device and from the second compute device, a signal representing a third video frame of the first user captured at a third time. The processor is further configured to estimate a second gaze direction of the first user in the second video frame. The processor is further configured to determine a second field of view of a first virtual representation in the virtual environment. The second field of view includes the third virtual representation and not the second virtual representation. The processor is optionally further configured to determine that the second gaze direction at least partially overlaps with the second field of view. The processor is further configured to generate (optionally in response to determining that the second gaze direction at least partially overlaps with the second field of view) a fourth video frame that shows the first virtual representation looking at the third virtual representation and not the second virtual representation. The processor is further configured to send, at a fourth time subsequent to the third time, the fourth video frame to the third compute device to cause the third compute device to display the fourth video frame within the virtual environment In an embodiment, a non-transitory, processor-readable medium stores code representing instructions executable by a processor, the code comprising code to cause the processor to receive a video stream of a user. Each video frame from the video stream includes a depiction of a gaze of the user. The code further comprises code to cause the processor to, for each video frame from the video stream, determine, substantially in real time as that video frame is received, an estimated gaze direction of the gaze of the user in that video frame. The code further comprises code to cause the processor to determine a field of view for a virtual representation associated with the user in a virtual environment. The code optionally further comprises code to cause the processor to compare the field of view for the virtual representation associated with the user to the estimated gaze direction of the gaze of the user to determine whether the field of view for the virtual representation associated with the user at least partially overlaps with the estimated gaze direction of the gaze of the user. The code further comprises code to cause the processor to generate (optionally based on the comparison of the field of view for the virtual representation associated with the user to the estimated gaze direction of the gaze of the user) an updated video frame including a modified gaze direction of the user different from the estimated gaze direction of the gaze of the user. The modified gaze direction can be in a direction toward another person, object, or other feature within the field of view for the virtual representation associated with the user. The code further comprises code to cause the processor to cause the updated video frame to be displayed.

BRIEF DESCRIPTIONS OF THE DRAWINGS

FIG. 3 illustrates examples of gazes before and after gaze redirection, according to an embodiment.

FIG. 8 shows example observed images with landmarks and model fits based on landmark similarity, according to some embodiments.

FIG. 9 shows example model fits on two different gaze datasets, showing estimated gaze and labelled gaze, according to some embodiments.

FIG. 14 shows a user interacting with his display screen, including initiating and performing the calibration process, according to an embodiment.

Figure 17A:
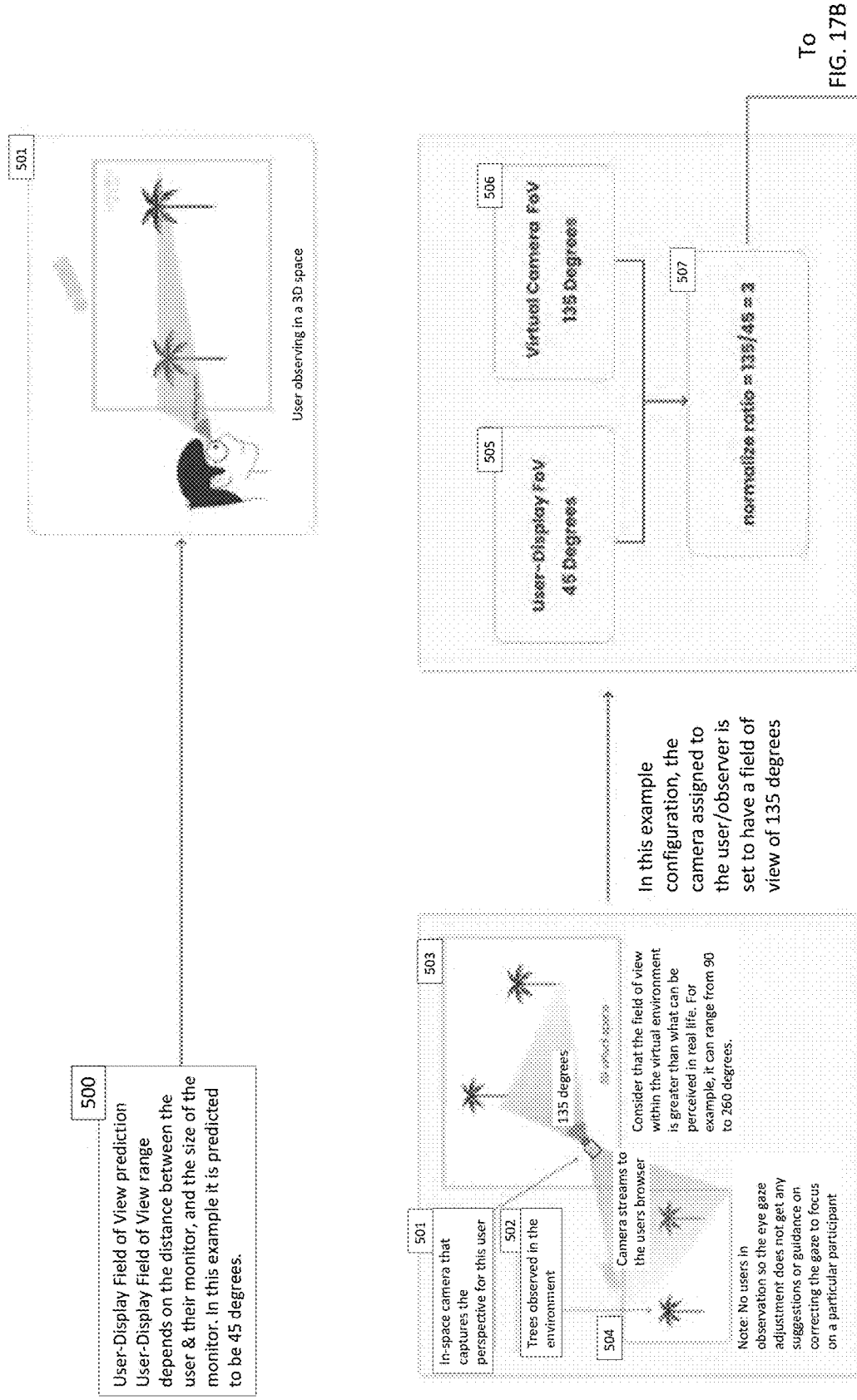
Figure 17B:
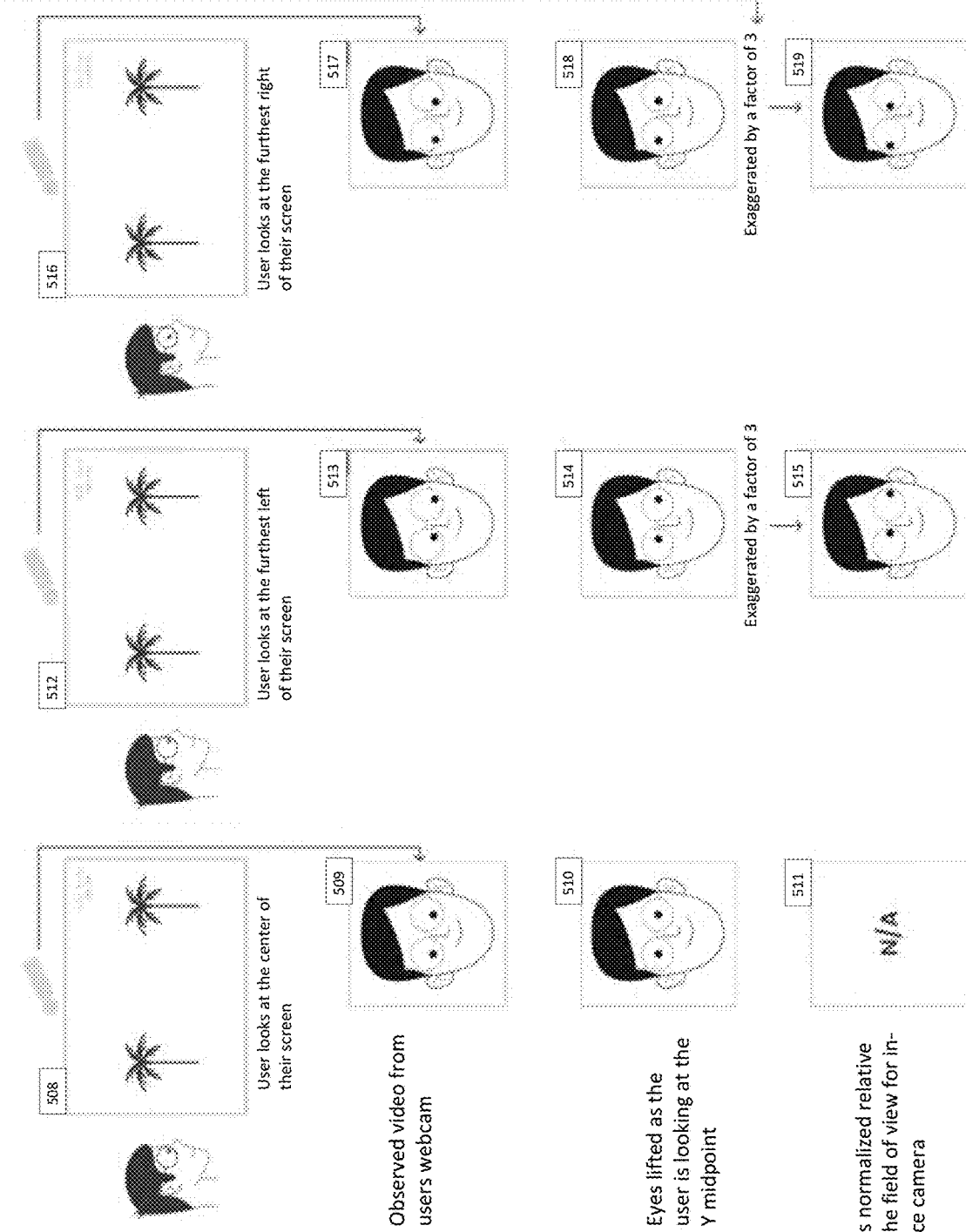

FIGS. 17A-17B show the client-server side interaction to normalize the eye gaze, taking into account the field of vision of the respective clients and the field of view within the virtual space, according to an embodiment. FIGS. 17A-17B go into detail to illustrate how the eyes are adjusted/lifted to make it appear as if their gaze could be as wide as the camera within the virtual space permits greater field of view.

Figure 18:
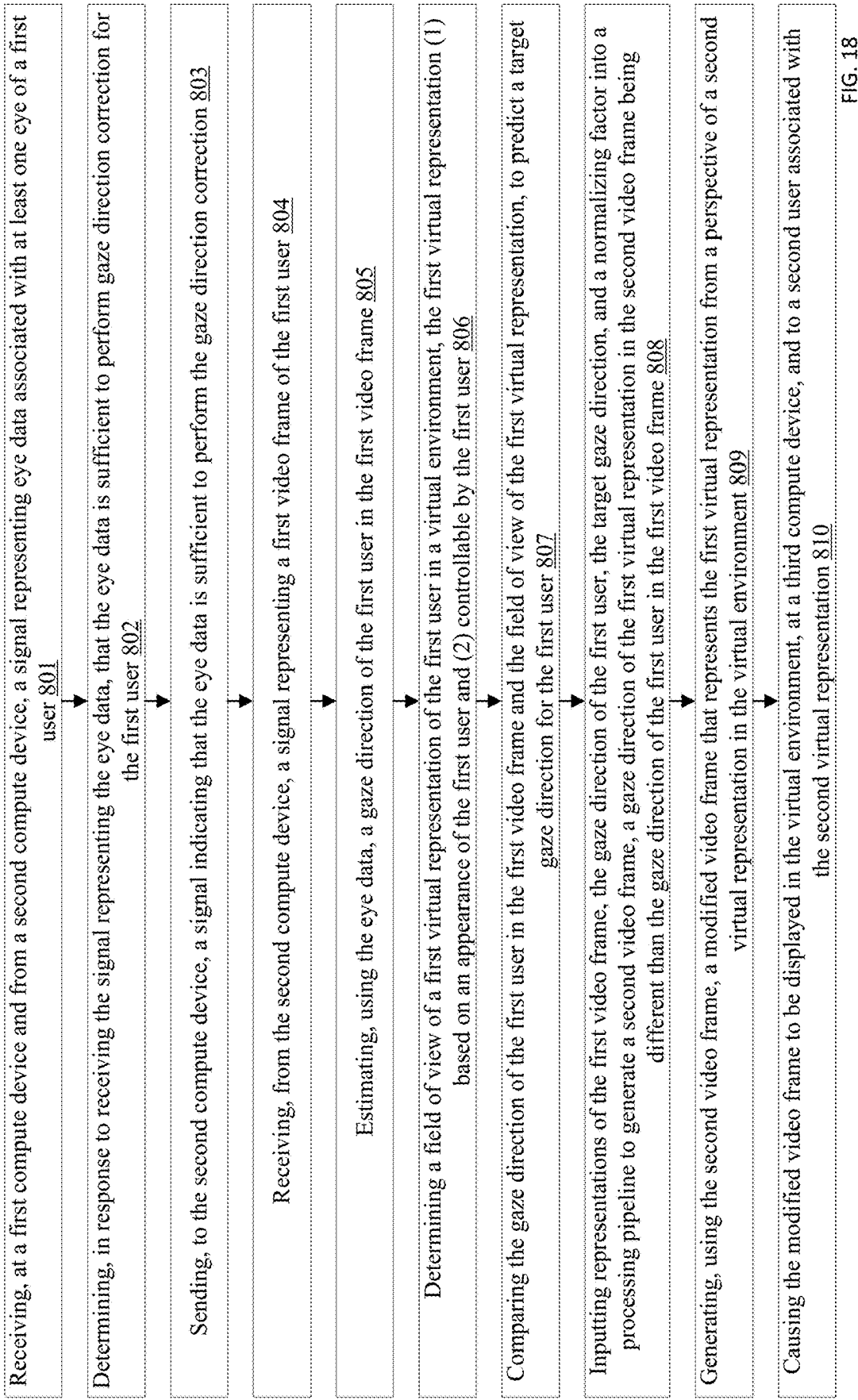

FIG. 18 shows a flowchart of a method for generating modified video frames with redirected gaze, according to an embodiment.

FIGS. 19A-19B shows a flowchart of a method for generating modified video frames with redirected gaze, according to an embodiment.

FIG. 20 shows a flowchart of a method for generating modified video frames with redirected gaze, according to an embodiment.

DETAILED DESCRIPTION

In the field of image processing, gaze correction involves adjusting/repositioning representations of eyes in an image such that they are directed toward a single new direction, which is typically normal to the camera plane. A gaze correcting device, for example, is a camera that produces a picture in which everyone is looking into the camera, when in fact at least a few of them had been looking in different directions. In other words, gaze correction involves modifying the appearance of the users' eyes so that all appear as if they were looking directly into the camera. In gaze redirection, by contrast, an image is altered to change a representation of where someone is looking, and this alteration can result in the person looking in any of a variety of directions, including directions other than directly into the camera. The ability of a process to impact adjustments to a subject's vision/line of sight (e.g., to any desired direction) can be desirable in some situations.

Figure 1:
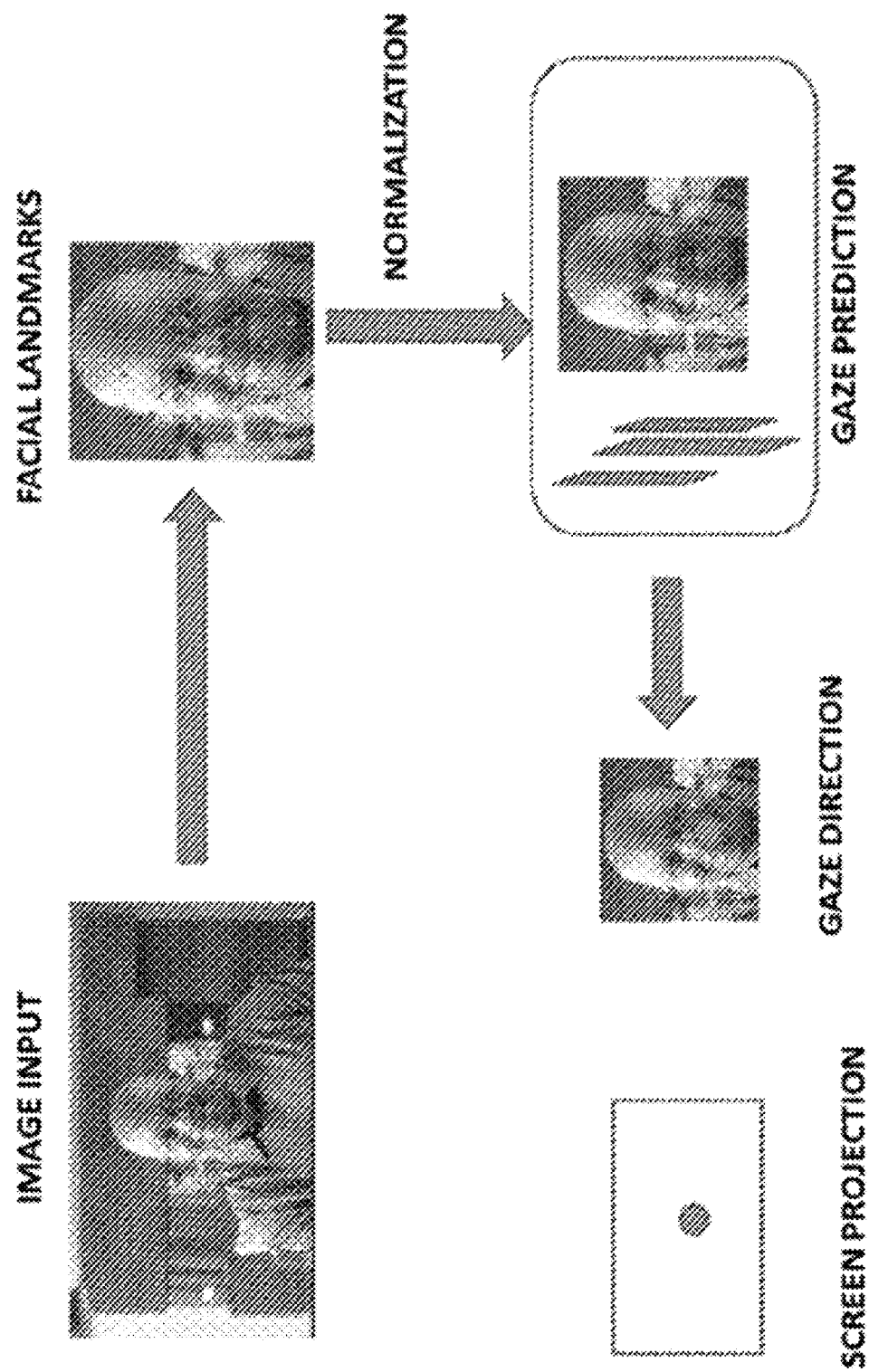
FIG. 1 illustrates a sequence associated with gaze estimation, according to an embodiment.

Some embodiments of the present disclosure facilitate the ability of a given person appearing within a 3D virtual world to accurately perceive an object of attention of any one or more other people appearing within the 3D virtual world (e.g., to accurately perceive who or what the one or more other people is/are looking at) by modifying a representation of an eye gaze of the one or more other people within the 3D virtual world, in real-time, based on their point of attention on a screen. For example, as shown in FIG. 1, an image of a user can be input into a software model. The software model can identify facial landmarks of the user from the image, perform normalization, and predict and/or estimate a gaze direction of the user in that input. The gaze direction of the user, as represented within a 3D virtual environment, can then be modified such that the modified gaze direction better conveys, to other users in the 3D virtual environment, the feature(s)/object(s) within a display on a screen (and, by proxy, within the 3D virtual environment) that the user is viewing.

Figure 2:
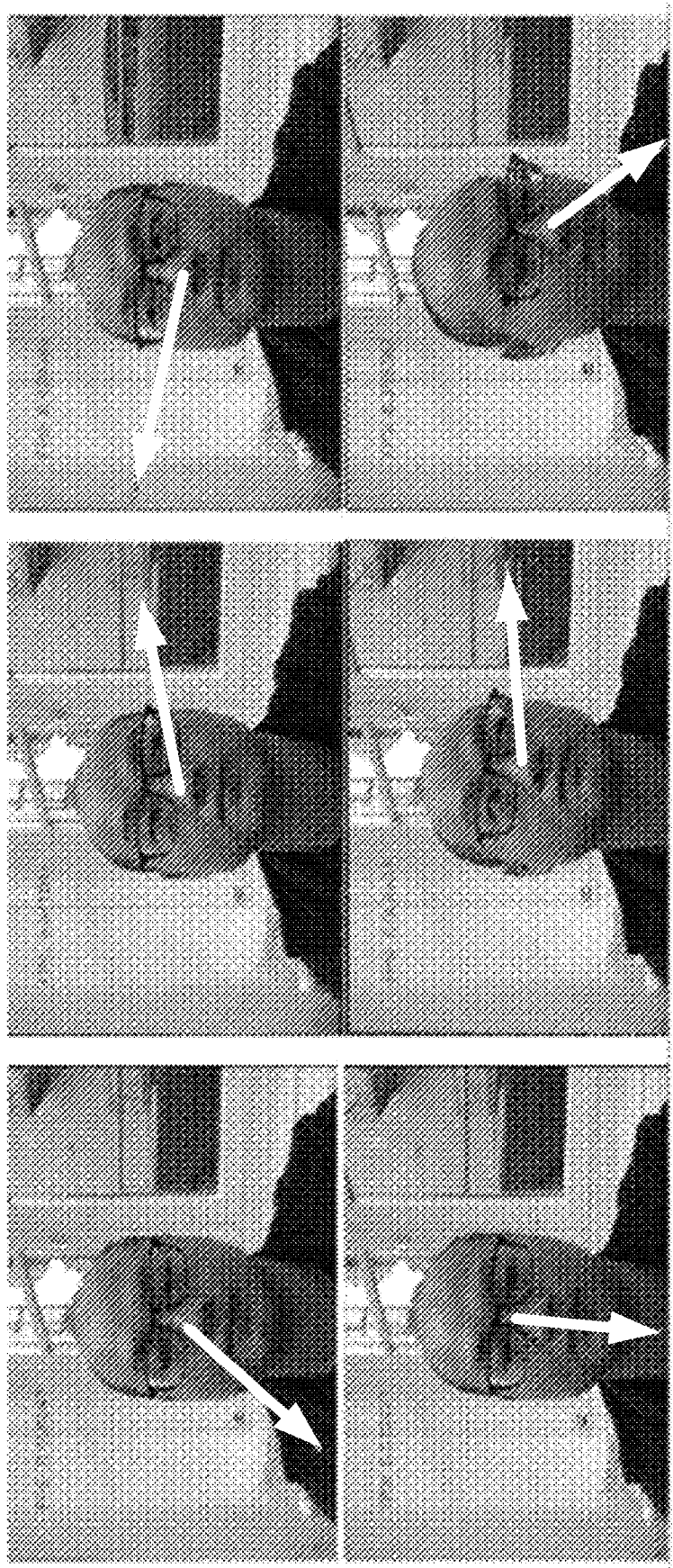
FIG. 2 illustrates examples of gaze estimation vectors, according to an embodiment.

In some implementations, an appearance-based gaze estimator is configured to detect a face, resize it, identify facial landmarks thereof, and process the resulting image. FIG. 2 shows various images of a user's gaze being predicted/ estimated and represented using an estimation vector. These estimation vectors can be used to modify representations of a gaze of a user in a virtual environment. In some implementations, data normalization is performed for noise removal and/or for improving estimation accuracy, in such a way that the Y-axis of the camera coordinate system lies normal to the Y-axis of the head coordinate system. The normalized image data is then scaled to reflect a fixed distance away from the face center. Thus, the input image may have only 2 degrees of freedom in head pose for all kinds of cameras with different intrinsic parameters.

Known gaze correction techniques exist. For example, view synthesis methods can re-resolve and render the subject's face in such a way that the subject appears to be looking at the camera. Various techniques involve the use of stereo-vision and monocular red green blue (RGB) cameras in combination with machine learning (ML) techniques, however unwanted facial distortions can result from such image manipulations.

As another example, eye replacement methods replace the eyes of a subject's image with new eye images having a different desired gaze. Replacement eye images may closely resemble the subject's natural eyes, since eye appearance is part of the identity of the subject, both to the subject him/herself and to the communicator on the other end. Thus, a need may exist for a large database containing representations of eyes of different shapes, sizes, colors and aspect ratios to choose from. Moreover, person-specific eye images can include defects/undesirable features such as eyelids that remain open, illumination differences, the inability to accommodate different head poses, and matching inaccuracies. As another example, warping-based methods are able to redirect gaze without person-specific training data. Continual learning can be used to generate a flow field from one eye image to another using training pairs of eye images with pre-defined gaze offsets between them. The flow field thus generated can be used to warp pixels in the original image, thereby modifying gaze. Here too, however, certain disadvantages exist, such as the inability to specify a new direction, limitations on the range of the possible redirections due to the invariability of the training dataset, and the inability to redirect an occluded gaze.

One or more embodiments of the present disclosure include eye gaze redirection systems that can mitigate the issues discussed above. For example, in some embodiments, a gaze is first defined, and then parameters of the gaze are modified/manipulated by taking into account a generative facial part and an emulated eyeball part, defined by a set of parameters that signify shape, texture, position (or "pose") and scene illumination, as discussed below. In some implementations, an eye region model is defined. The eye region model can be used to determine characteristics of a user's eye(s), such as color, texture, orientation, alignment, etc. Some attributes of the eye region model include:

1. Scene Illumination: In some implementations, an eye region is represented by a Lambertian optical scenario with ambient and directional lights, the former being a light of incidence and the latter being defined by the rotation, pitch and yaw of an eyeball model. This model can be suitable for a relatively small facial zone.
2. Shape: In some implementations, an eye region is dimensionally-reduced to a fixed number of vertices forms a sparse mesh with an assumption that a given face is symmetric. The average face shape, modes of shape variation and standard deviations of these modes are the governing features of an eye region model. The eyeball is modelled as a standard two-sphere based on physiological averages, including the scaling of vertices on the iris boundary about the iris.
3. Texture: Some implementations use a dimensionally-reduced texture model of the facial eye region from a set of similar photographs. The colors of a region of vertices can be used to generate a RGB texture map controlled by average face texture.
4. Pose: In some implementations, pose parameters are defined that describe both global pose(s) and local pose(s). Globally, the eye regions are positioned/defined with rotation and translation. The eyeball positions can be fixed in relation to the eye regions. The local pose parameters can allow rotation of the eyeballs from the face, controlling the apparent gaze. The general gaze direction is given by pitch and yaw angles. When an eyeball looks up or down, the associated eyelid follows it. Procedural animation can be used to pose the eyelids in the facial mesh by a rotational magnitude.

Example 3D Eye Region Model

In some implementations, a 3D eye region model is used to synthesize an image that matches an input RGB eye image. To render synthetic views, a multi-part model consisting of the facial eye region and the eyeball can be used. The facial eye region and the eyeball can be posed in a scene, illuminated, and then rendered using a model of camera projection. A total set of model and scene parameters $\Phi$ can be defined as:

$$\Phi = \{\beta, \tau, \theta, \iota, \kappa\}, \qquad (1)$$

where $\beta$ are the shape parameters, $\tau$ are the texture parameters, $\theta$ are the pose parameters, $\iota$ are the illumination parameters, and $\kappa$ are the camera parameters. Each part of the model, and the parameters that affect it, are discussed below.

Morphable Facial Eye Region Model—$\beta,\tau$

Figure 4:
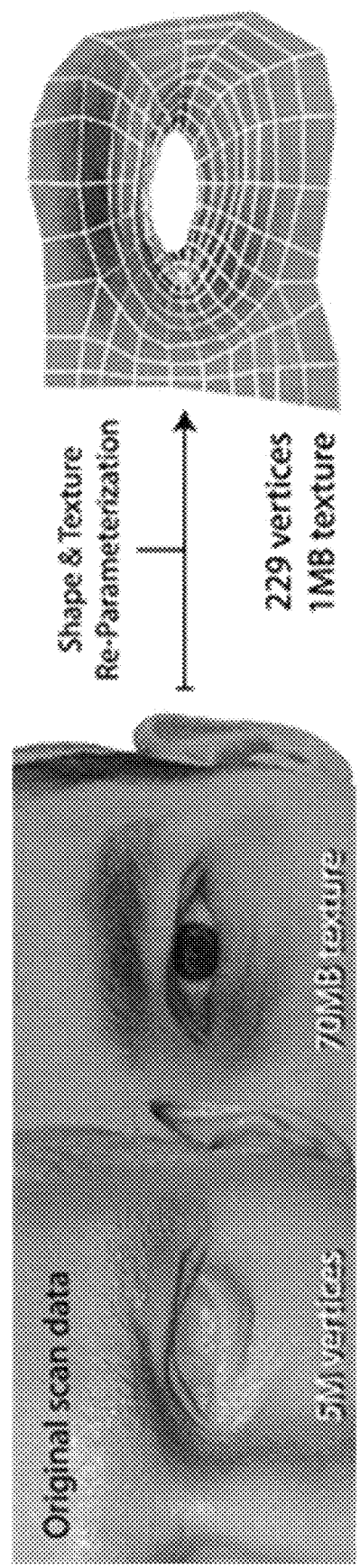
FIG. 4 shows example 3D head scan data and a re-parameterization thereof, according to some embodiments.
Figure 5:
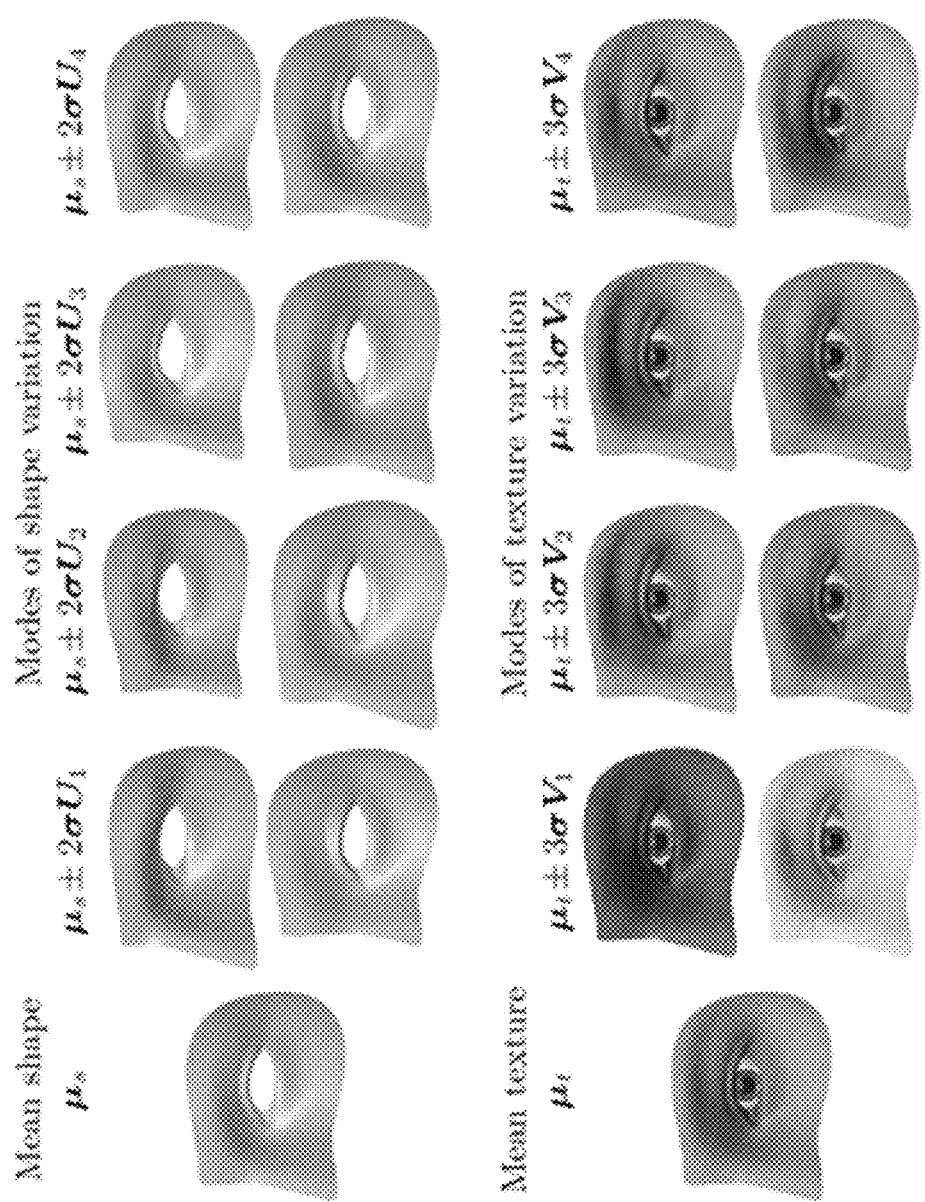
FIG. 5 shows examples of eye region shape and texture variations, according to some embodiments.

In some implementations, a 3D morphable model (3DMM) of an eye region serves as a prior for facial appearance. Although some known approaches have historically used a generative shape model of the eye region, the 3DMM described herein captures both shape and texture variation. Head scans may be acquired as source data. The first stage of constructing a morphable model includes bringing scan data into correspondence, so that a point in one face mesh is semantically equivalent to a point in another. Although some known approaches have historically computed a dense point-to-point correspondence from original scan data, approaches discussed herein compute sparse correspondences that describe 3D shape more efficiently. Each original high-resolution scan can be manually re-parameterized into a low resolution topology that includes the eye region only (see FIG. 4). This topology does not include the eyeball, since the eyeball will be posed separately to simulate its independent movement. Correspondences are maintained for detailed parts, e.g. the interior eyelid margins, which have historically been inadequately defined. The mesh is uv-unwrapped, and color is represented as a texture map, coupling the low-resolution mesh with a high-resolution texture. FIG. 5 shows the mean shape $\mu_s$ and texture $\mu_t$ along with the first four modes of variation. The first shape mode $U_1$ varies between hooded and protruding eyes, and the first texture mode $V_1$ varies between dark and light skin.

Following this registration, the facial eye regions can be represented as a combination of 3D shape s (n vertices) and 2D texture t (m texels), encoded as 3n and 3m dimensional vectors respectively:

$$s = [x_1, y_1, z_1, x_2, \ldots y_n, z_n]^T \in \mathbb{R}^{3n} \quad (2)$$

$$t = [r_1, g_1, b_1, r_2, \ldots g_m, b_m]^T \in \mathbb{R}^{3m} \quad (3)$$

where $x_j$, $y_j$, $z_j$ is the 3D position of the jth vertex, and $r_j$, $b_j$, $g_j$ is the color of the jth texel. Principal Component Analysis (PCA) can then be performed on the set of c ordered scans to extract orthogonal shape and texture basis functions: $U \in \mathbb{R}^{3n \times c}$ and $V \in \mathbb{R}^{3m \times c}$. For each of the 2m shape and texture basis functions, a Gaussian distribution can be fit to the original data. Using this fit, linear models can be constructed that describe variation in both shape $M_s$ and texture $M_t$:

$$\mathcal{M}_s = (\mu_s, \sigma_s, U) \quad (4)$$

$$\mathcal{M}_t = (\mu_t, \sigma_t, V),$$

where $\mu_s \in \mathbb{R}^{3n}$ and $\mu_t \in \mathbb{R}^{3m}$ are the average 3D shape and 2D texture, and $\sigma_s = [\sigma_{s1} \ldots \sigma_{sc}]$ and $\sigma_t = [\sigma_{t1} \ldots \sigma_{tc}]$ describe the Gaussian distributions of each shape and texture basis function. FIG. 5 shows the mean shape and texture, along with four important modes of variation. Facial eye region shapes s and textures t can then be generated from shape ($\beta_{face} \subset \beta$) and texture coefficients ($\tau_{face} \subset \tau$) as follows:

$$s(\beta_{face}) = \mu_s + U \operatorname{diag}(\sigma_s) \beta_{face} \quad (5)$$

$$t(\tau_{face}) = \mu_t + V \operatorname{diag}(\sigma_t) \tau_{face} \quad (6)$$

From the set of c=22 scans, 90% of shape and texture variation can be encoded in 8 shape and 7 texture coefficients. This reduction in dimensionality is important for efficient model fitting. Also, since eyelashes can provide a visual cue to gaze direction, eyelashes can be modelled using a semi-transparent mesh controlled, for example, by a hair simulation.

Figure 6:
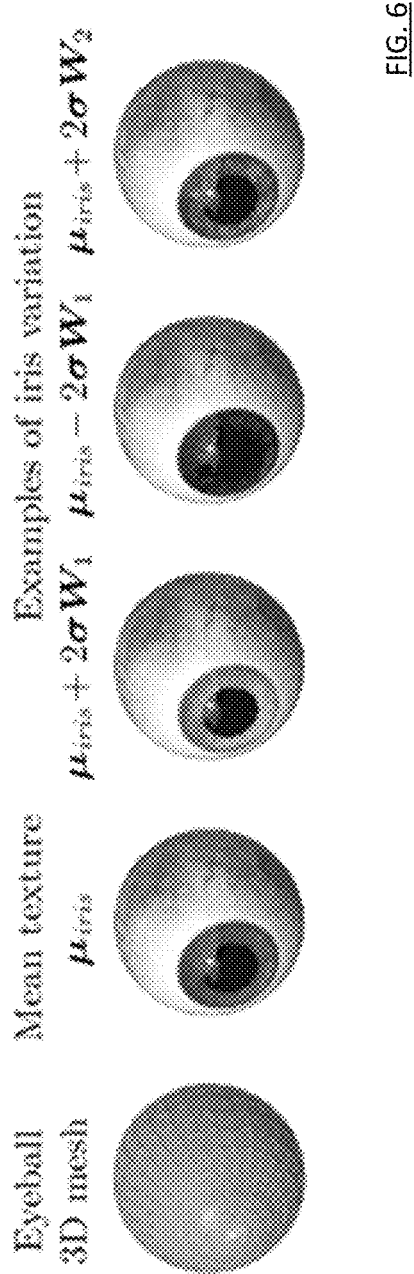
FIG. 6 shows examples of an eyeball mesh, mean iris texture, and iris texture variations, according to some embodiments.

FIG. 6 shows an example eyeball mesh, mean iris texture $\mu_{iris}$, and some examples of iris texture variation captured by a linear model $M_{iris}$.

Parametric Eyeball Model—$\beta,\tau$

The second part of the multi-part model pertains to the eyeball. Accurately recovering eyeball shape can be difficult due to its complex structure. A mesh can be created, for example using standard anatomical measurements, for this purpose (see FIG. 6). Eyeballs can vary significantly in shape and texture among different people. Changes in iris size can be modelled geometrically, for example by scaling vertices on the iris boundary about the 3D iris centre as specified by iris diameter $\beta_{iris}$. A collection of aligned high-resolution iris photos can be used to build a generative model $M_{iris}$ of iris texture using PCA:

$$\mathcal{M}_{iris} = (\mu_{iris}, \sigma_{iris}, W) \quad (7)$$

This can be used to generate new iris textures $t_{iris}$. To account for the fact that the "white" of the eye is not purely white, variations in sclera color can be modelled by multiplying the eyeball texture with a tint color $\tau_{tint} \in \mathbb{R}^3$. The eyeball has a complex layered structure with a transparent cornea covering the iris. To avoid explicitly modelling this, refraction effects can be computed in texture-space.

Posing the Multi-Part Model—$\theta$

In some implementations, global and local pose information re encoded by $\theta$. The model's parts can be defined in a local coordinate system with its origin at the eyeball centre, and model-to-world transforms $M_{face}$ and $M_{eye}$ can be used to position them in a scene. The facial eye region part has degrees of freedom in translation and rotation, which can be encoded as 4×4 homogenous transformation matrices T and R in a model-to-world transform $M_{face}$=TR. The eyeball's position can be anchored to the face model, while able to rotate separately through local pitch and yaw transforms $R_x(\theta_p)$ and $R_y(\theta_y)$, giving $M_{eye}$=$TR_xR_y$.

When the eye looks up or down, the eyelid follows it. Eyelid motion can be modelled using procedural animation, with each eyelid vertex rotated about the inter-eye-corner axis, with rotational amounts chosen to match known measurements (e.g., from an anatomical study). Since the multi-part model can include disjoint parts, the eyelid skin can be "shrinkwrapped" to the eyeball, projecting eyelid vertices onto the eyeball mesh to avoid gaps and clipping issues.

Scene Illumination—$\iota$

In some implementations, since a relatively small region of the face is being analyzed/modelled, a simple illumination model can be assumed, where lighting is distant and surface materials are purely Lambertian. The illumination model can define, for example, an ambient light with color $l_{amb} \in \mathbb{R}^3$, and a directional light with color $l_{dir} \in \mathbb{R}^3$ and 3D direction vector L. Specular effects, global illumination, and self-shadowing may be excluded, such that illumination depends only on surface normal and albedo. Radiant illumination $\mathcal{L}$ at a point on the surface with normal N and albedo c can be calculated as:

$$\mathcal{L}(n, c) = cl_{amb} + cl_{dir}(N \cdot L) \quad (8)$$

Camera Projection—$\kappa$

For a complete model of image formation, camera projection can also be considered, for example by fixing an axis-aligned camera at a world origin, and setting the world-to-view transform as the identity $I_4$. Assuming knowledge of intrinsic camera calibration parameters $\kappa$, these can be used to construct a full projection transform P. A local point in the model can then be transformed into image space using the model-view-projection transform $PM_{\{face|eye\}}$.

Figure 7:
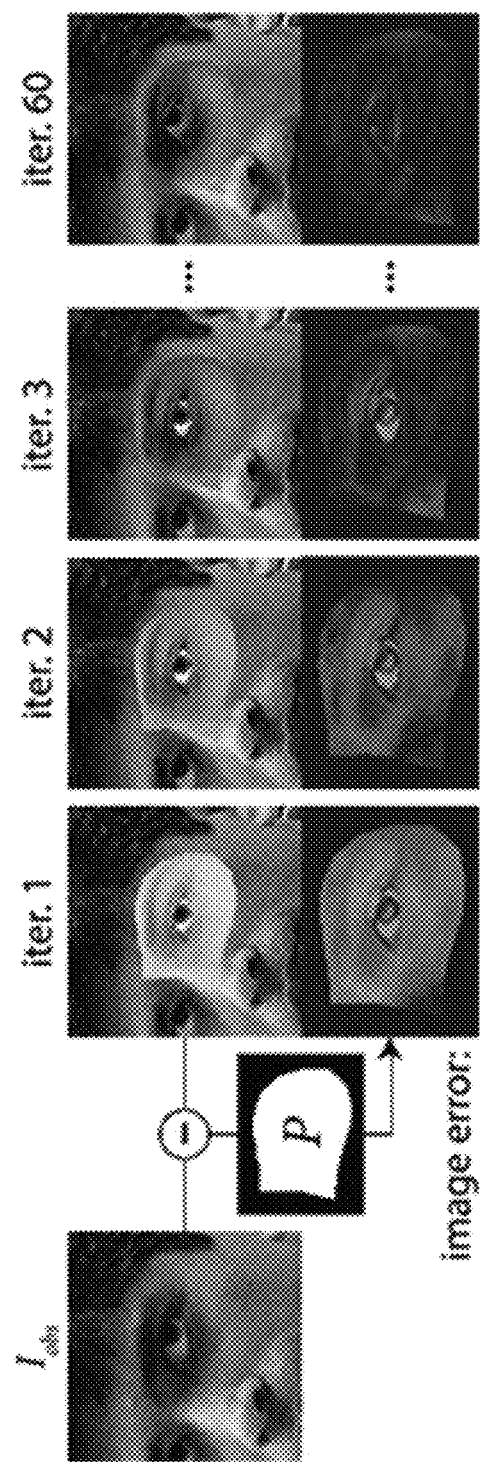
FIG. 7 shows example dense image-similarity measurements over a mask of foreground pixels, according to some embodiments.

FIG. 7 shows measurements of dense image-similarity as the mean absolute error between $I_{obs}$ and $I_{syn}$, over a mask of rendered foreground pixels P (white), with error for background pixels (black) ignored.

Analysis-by-Synthesis for Gaze Estimation

Given an observed image $I_{obs}$, consider producing a synthesized image $I_{syn}(\Phi^*)$ that best matches it. A 3D gaze direction g can then be extracted from the eyeball pose parameters, and a search can be performed for optimal model parameters $\Phi^*$ using analysis-by-synthesis. To accomplish this, a synthetic image $I_{syn}(\Phi)$ can be iteratively rendered and compared to $I_{obs}$ using the energy function, and $\Phi$ can be updated accordingly. The foregoing can be cast as an unconstrained energy minimization problem for unknown $\Phi$, as follows:

$$\Phi^* = \underset{\Phi}{\operatorname{argmin}} E(\Phi) \qquad (9)$$

Objective Function

In some implementations, energy is formulated as a combination of a dense image similarity metric $E_{image}$ that minimizes difference in image appearance, and a sparse landmark similarity metric $E_{ldmks}$ that regularizes the model against reliable facial feature points, and weight $\lambda$ controlling their relative importance:

$$E(\Phi) = E_{image}(\Phi) + \lambda \cdot E_{ldmks}(\Phi, L) \qquad (10)$$

Image Similarity Metric

In some implementations, a primary goal is to minimize the difference between $I_{syn}$ and $I_{obs}$. This can be regarded as an ideal energy function: if $I_{syn} = I_{obs}$, the model must have perfectly fit the data, so virtual and real eyeballs should be aligned. This can be approached by including a dense photo-consistency term $E_{image}$ in the energy function. However, as the 3DMM in $I_{syn}$ does not cover the entire of $I_{obs}$, the image may be split into two regions: a set of rendered foreground pixels P over which error is computed, and a set of background pixels that are ignored (see FIG. 7). Image similarity can then be computed as the mean absolute difference between $I_{syn}$ and $I_{obs}$ for foreground pixels $p \in P$:

$$E_{image}(\Phi) = \frac{1}{|P|} \sum_{p \in P} |I_{syn}(\Phi, p) - I_{obs}(p)| \qquad (11)$$

FIG. 8 shows $I_{obs}$ with landmarks L (white dots), and model fits with the landmark similarity term (top), and without (bottom). Note how erroneous drift is prevented in global pose, eye region shape, and local eyelid pose.

Landmark Similarity Metric

The face contains important landmark feature points that can be localized reliably. These can be used to efficiently consider the appearance of the whole face, as well as the local appearance of the eye region. A face tracker can be used to localize 14 landmarks L around the eye region in image-space (see FIG. 8). For each landmark $l \in L$, a corresponding synthesized landmark l' may be computed using the 3DMM. The sparse landmark-similarity term can be calculated as the distance between both sets of landmarks, normalized by the foreground area to avoid bias from image or eye region size. The foregoing acts as a regularizer to prevent the pose θ from drifting too far from a reliable estimate.

$$E_{ldmks}(\Phi, L) = \frac{1}{|L|} \sum_{i=0}^{|L|} \|l_i - l'_i\| \qquad (12)$$

FIG. 9 shows example model fits on gaze datasets Eyediap (HD and VGA) and Columbia, showing estimated gaze (annotated "E" in FIG. 9) and labelled gaze (annotated "L" in FIG. 9).

Optimization Procedure

In some implementations, the model may be fit to a subject's left eye, for example using gradient descent (GD) with an annealing step size. Calculating analytic derivatives for a scene as complex as the eye region is challenging due to occlusions. Numeric central derivatives ∇E can be used to guide the optimization procedure:

$$\Phi_{i+1} = \Phi_i - t \cdot r^i \nabla E(\Phi_i) \qquad (13)$$

where $$\nabla E(\Phi_i) = \left( \frac{\partial E}{\phi_1} \cdots \frac{\partial E}{\phi_{|\Phi|}} \right) \text{ and } \frac{\partial E}{\phi_j} = \frac{E(\Phi_i + h_j) - E(\Phi_i - h_j)}{2h_j}, \qquad (14)$$

where $t = [t_1 \ldots t_{|\Phi|}]$ are per-parameter step-sizes, $h = [h_1 \ldots h_{|\Phi|}]$ are per-parameter numerical values, and r the annealing rate. t and h were calibrated through experimentation.

Initialization

To perform local optimization, an initial model configuration may be defined. The initial model configuration can include, for example, 3D eye corner landmarks and head rotation from a face tracker to initialize T and R. 2D iris landmarks and a single sphere eyeball model may then be used to initialize gaze. β and τ may be initialized to 0, and illumination $l_{amb}$ and $l_{dir}$ may be set to [0.8, 0.8, 0.8].

Runtime

FIG. 7 shows convergence for a typical input image, with $I_{obs}$ size 800×533 px, and $I_{syn}$ size 125×87 px. Convergence may occur after 60 iterations for 39 parameters, taking 3.69 s on a typical PC (3.3 Ghz CPU, GTX 660 GPU).

Extracting Gaze Direction

When estimating 3D gaze direction g in camera-space, and once a fitting procedure has converged, g can be extracted, for example by applying the eyeball model transform to a vector pointing along the optical axis in model-space: $g = M_{eye}[0, 0, -1]^T$. Additional details related to example implementations of the eye model can be found, by way of example, in Wood, E., et. Al., "A 3D Morphable Eye Region Model for Gaze Estimation," Proc. European Conference on Computer Vision (ECCV), pp. 297-313 (2016), the entire contents of which are incorporated by reference herein for all purposes.

Some implementations use an energy function that is to be reduced (e.g., minimized), such that discrepancies between reality (e.g., a ground truth gaze/gaze direction of a user) and a modeled, predicted, or estimated gaze/gaze direction for the user are minimized. In some machine learning implementations, movement of a machine learning model towards inaccuracy is minimized by adjusting the parameters. One way to achieve this is to use the energy function as a loss function and to minimize the loss function directly. In some contexts described herein, such minimization of the loss function is an attempt to maintain a heuristic balance between the uniqueness of the eye characteristics of a user and a pre-existing machine learning model. In some implementations, the energy function is a weighted sum of several terms signifying the various parameters of the model fit. In some implementations, a Gauss-Newton algorithm can be used for minimizing the energy function, and each term can be expressed as a sum of squares. The data terms guide the model fit using image pixels and facial landmarks, where the prior terms penalize the unreal facial shape, texture and eyeball orientations.

FIG. 3 shows an example illustration of gaze redirection, according to an embodiment. Although Stanvin may be looking at Angelina on his screen, and Angelina looking at Stanvin on her screen, video of Stanvin and/or Angelina may show Stanvin, Angelina, and/or both looking elsewhere (as shown in the "Before" image). In some implementations, gaze modification can be performed such as Angelina and Stanvin are looking at each other in a virtual environment (as shown in the "After" image).

Figure 10:
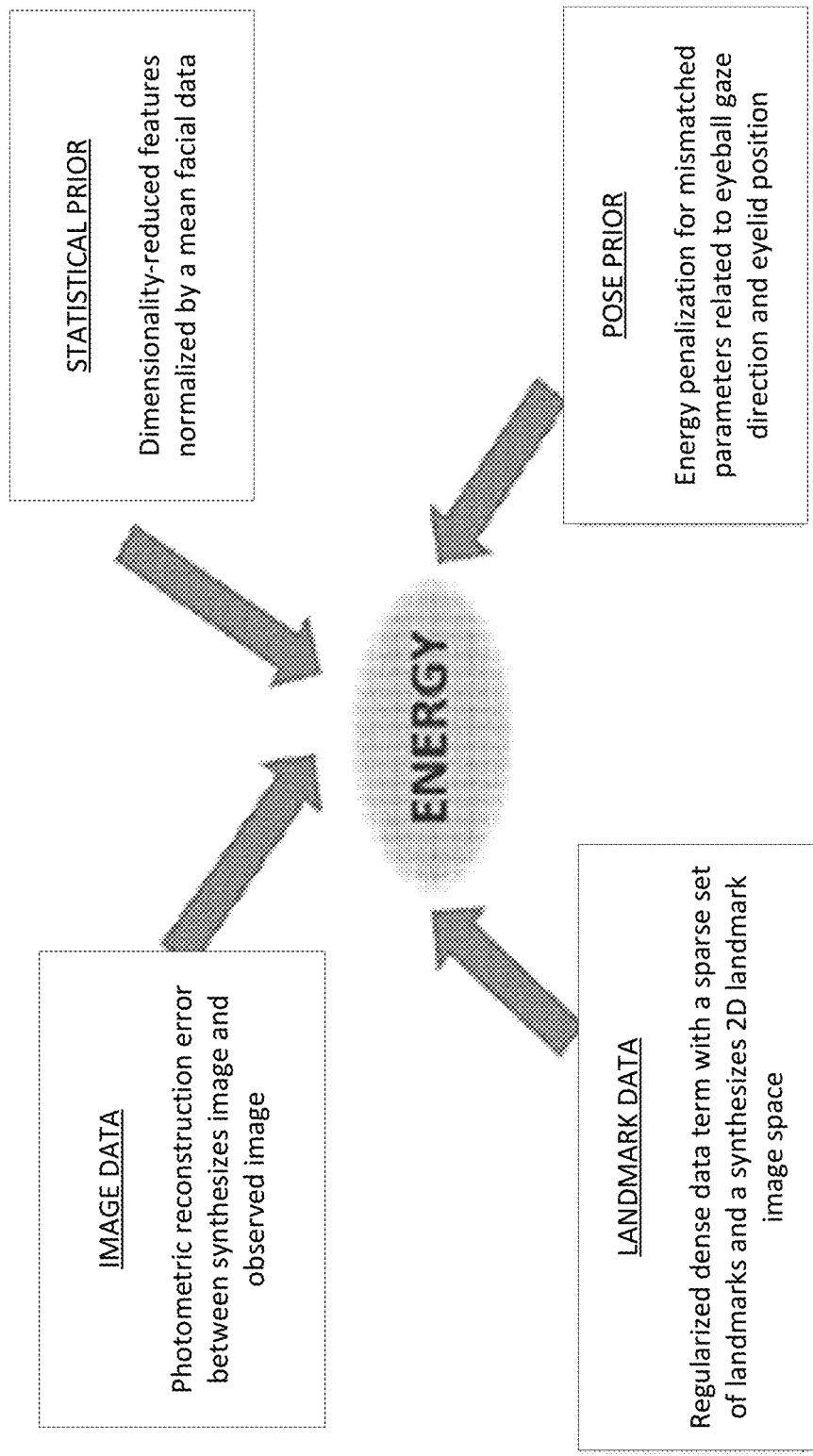
FIG. 10 illustrates an energy summation to be minimized, according to an embodiment.

1. FIG. 10 illustrates an energy summation, for use in minimizing discrepancies between a true gaze and a modeled gaze, in the context of gaze redirection, according to an embodiment. Considerations for each component of the energy summation are as follows:

1. Image Data Similarity: In some implementations, the photometric reconstruction error between a synthesized image (or fitted model) and an observed image can be reduced (e.g., minimized). A data term can measure the relevance of the fitted model with respect to the observed image, by measuring the dense pixel-wise differences across the images. An edge detection algorithm for segmenting the set of rendered foreground pixels, with the background pixels ignored, can also be defined. Segmenting the set of rendered foreground pixels can include collecting similar pixels (e.g., detected in an image according to a selected threshold, region merging, region spreading and/or region growing) and separating them from dissimilar pixels. In some implementations, a boundary-based approach is adapted, as the method for object identification instead of a region-based approach. Unlike region-based detection, where pixels are identified as having similar features, one can identify pixels that are dissimilar to one another in the boundary-based approach.

2. Landmark Data Similarity: The face contains several landmark feature points that can be tracked reliably. A dense data term $E_i$mg can be regularized using a sparse set of landmarks "$\mathcal{L}$" provided by a face tracker. $\mathcal{L}$ can consist, for example, of 25 points that describe the eyebrows, nose and/or eyelids. For each 2D tracked landmark $\iota \in \mathcal{L}$, a corresponding synthesized 2D landmark $\iota'$ can be computed, for example as a linear combination of projected vertices in a shape model. Facial landmark similarities are incorporated into the energy summation using data measured in image-space. The energy can be normalized by dividing through by the foreground area ("P"), to avoid bias from eye region size in the image. For example, as landmark distances $|\iota_i - \iota'_i|$ are measured in image-space, the energy can be normalized by dividing through by the foreground area to avoid bias from eye region size in the image. The importance of $E_{ldms}(\Phi)$ (energy function component involving landmark similarity) is controlled with weight $\lambda_{tdmks}$ (weight function influenced by the parameters discussed above), where $\Phi$ refers to the eye model.

3. Statistical Prior: Unnatural facial shapes and/or textures can be penalized using a "statistical prior." As used herein, a "statistical prior" refers to a "prior probability distribution" in Bayesian statistical inference, which is the probability distribution that would express one's beliefs about the quantity before some evidence is taken into account. Assuming a normally distributed population, dimensionally-reduced model parameters should be close to the mean of 0. This energy helps the model fit avoid geometrically disproportionate facial shapes and/or textures, and guides the model's recovery from poor local minima found in previous frames.

4. Pose Prior: Another energy penalizes mismatched parameters for eyeball gaze direction and eyelid position. The eyelids follow eye gaze, so if the eyeball is looking upwards, the eyelids should be rotated upwards, and vice versa. Eyelid pose consistency with the 3D eyeball is enforced so that that any unrealistic relationship between the eyelid pose and the eyeball position is avoided.

Once a set of fitted model parameters ($\Phi$," for an image $I_{obs}$) have been obtained, gaze is redirected to point at a new 3D target g'. First, $\Phi$" is modified to obtain $\Phi'$, which represents the redirected gaze. The optical flow between eye region models with $\Phi$" and $\Phi'$ is then calculated, and used to warp the eyelids in the source image.

Gaze is thus redirected in two steps:

1. Warp the eyelids in the original image using a flow field derived from the 3D model. This flow field is efficiently calculated by re-posing the eye region model to change the gaze represented, and rendering the image-space flow between tracked and re-posed eye regions.

2. Render the redirected eyeballs and composite them back into the image. The boundary between the skin and eyeball may be blurred, to soften the transition so that the eyes "fit in" better.

Some implementations include a hybrid model-appearance-based gaze estimator serving on a backend AI-ML-Physics kernel, in conjunction with front-end application programming interfaces (APIs) and a gaze redirector, accurate enough to compute quantitatively and qualitatively, and predict quantitatively and qualitatively, the point of attention of a subject on a display screen in real-time.

Some implementations include a hybrid warping-based gaze redirector serving on a backend AI-ML-Physics kernel, in conjunction with front-end APIs and a gaze estimator, capable of warping and redirecting a hybrid eye model, in accordance with processed data flow from the gaze estimator, to adjust eye gaze in real-time video communication applications.

Some implementations include a data-inspired and physics-driven machine learning kernel comprising two components—a gaze estimator and a gaze redirector. As used herein, data-inspired refers to the property of being driven by derived data involving statistical learning based on historical data associated with the user. Physics-driven refers to the property of being driven by data on and about iris localization, eye reflection measurements, pupil centroid tracking, and/or other measurable properties with processes/algorithms within the computer vision domain. The gaze estimator makes it possible for people within a 3D virtual world to accurately perceive any person's object of attention by modifying 3D representations of participant eye gaze(s) in real-time, based on their point of attention on the screen (i.e., what he/she is looking at on a display screen). The gaze redirector can be configured to undergo continuous learning and generation of flow fields from one eye image to another, e.g., using training pairs of eye images with pre-defined gaze offsets between them. The flow field thus generated by the redirector can be used to warp pixels in an original image, thereby modifying gaze. As such, the 3D experience provided by the eye-contact enhancements presented herein can improve the virtual reality feel and sense of interpersonal conversations.

Some implementations are related to eye gaze modifications in video. For example, after capturing eye data of a first user via a calibration process (e.g., via a compute device associated with the first user), a video stream of the first user can be captured. The gaze of the first user in the video stream can be modified to produce a modified gaze, such that a second user views the first user (e.g., at a compute device associated with the second user) with the modified gaze.

Figure 11:
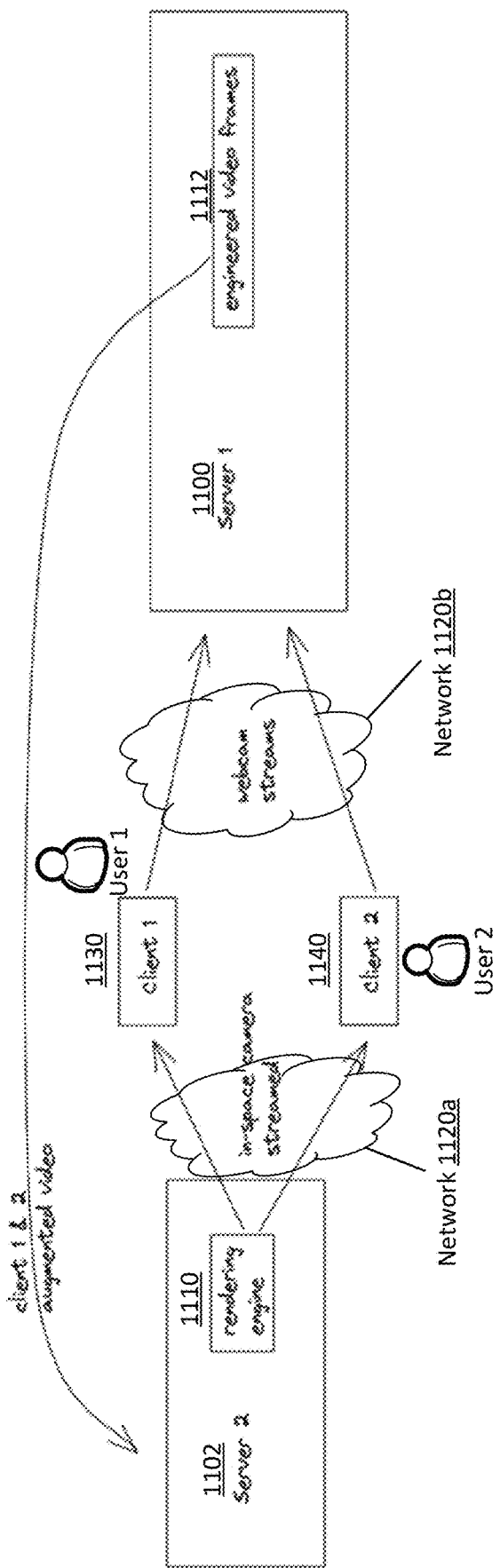
FIG. 11 shows a system block diagram associated with an eye gaze adjustment system, according to an embodiment.

Some implementations are related to single-angle calibration or multiple angular calibration of eye gaze of multiple users, optionally performed in parallel. For the calibration process, one or more user(s) can login to a front end interface (e.g., via a user compute device) and register for a new-user session or an existing-user session. When the user is a new user, the system prompts them to perform calibration to enable an eye gaze adjustment system (implemented, for example, as shown in FIG. 11). The user(s) can respond to the various interactive prompts using their eyes and/or their keyboard or other input device. The user's eye(s) may be still/stationary when the user initially looks into the camera, and the system can then prompt the user to move their eye(s) around, for example along one or more different predefined patterns displayed to the user, which the user can follow. At substantially the same time or during an overlapping period of time, there can be several different users who are responding to similar (or modified) prompts laid out by the network of computers on the computer, collectively referred to herein as the "backend" or server cluster, to perform the same exercise.

In some implementations, the system's front end, or "front end interface" (e.g., implemented in software, such as a graphical user interface (GUI)), which communicates with or receives feedback/instructions from the backend, is configured to collect the user eye gaze data (i.e., eye data), store (or cause storage of) the eye data at the backend, and/or gather eye data using software routines for heuristic gauging and gaze re-correction purposes. The heuristic gauging can include optimization of heuristic parameters based on one or more rule evaluation metrics such as an F-measure, the Klösgen measure, and/or the m-estimate. The one or more rule evaluation metrics can be used in a multiple regression. The feedback/instructions from the backend can include, for example, instructions regarding what the GUI should request from the user next (e.g., capture additional X, Y coordinates from one or more specified areas). In some implementations, the front end, in its capacity of functioning in unison with the backend, is configured to collect 2D planar data of the user's eye as detected/measured by the camera and the software. The backend can be configured to convert these 2D planar data of the user's eye into a re-engineered version of eye gaze of the user(s) in a 3D world coordinate system. The front end can cause display, for example on a computer monitor or mobile device screen (serving as an interactive display of the user), of an object such as a ball, and ask/instruct the user to move their eye focus to wherever the object moves. The object can be displayed as moving, or intermittently/sporadically moving, to various locations on the screen, and the front end can collect the user eye data while recording where the object was located on the screen when the eye data was captured. The front end and/or a compute device operably coupled to the front end optionally compresses the eye data and transmits or causes transmission of the eye data to the backend. The backend determined whether any additional translations/movements of the object within the display are desired for attaining accurate predictions/estimations of eye gaze by taking into account (e.g., comparing) the eye data already acquired with pre-existing data models of various users, inference models from heuristics, and/or the precision of the measured data. When the backend indicates that the eye data already collected is sufficient, the backend signals to the front end to stop collecting further eye data, and the front end displays a welcome message to the user, welcoming the user to the session as a newcomer.

The cluster of computers (which may be deployed remotely) collectively referred to herein as the server or the backend can be configured to generate compressed user eye data received from the front end, and leverage the compressed user eye data when augmenting a user's eye gaze in real-time. The cluster of computers can include any number of computers, such as 1, 2, 3, etc.

In some implementations, the backend is configured to apply one or more different physical and heuristic algorithms to achieve a desired effect (e.g., a cognitive effect). The cognitive effect can refer to an intuitive and integrative effect that influences the end-user to believe that the eye motion of the counterpart user is in accordance with the context of the visual interactions within the 3D environment. Example physical algorithms can include iris center localization in low-resolution images in the visible spectrum. In some implementations, gaze tracking may be performed without any additional hardware. An example two-stage process/algorithm can be used for iris center localization, based on geometrical characteristics of the eye. A coarse location of the urus center can be computed by a convolution algorithm in the first stage, and in the second stage, the iris center location can be refined using boundary tracing and ellipse fitting. The server is configured to calculate a compounding factor which is a resultant of the most recent user data, a predictive component, an existing meta-heuristic model and a correction influenced by a previous episode/interaction of a similar user. The operations of the system are intricately scheduled by automatic balancing between the client-side data received and the computing capacity of the server side. As soon as the user enters the virtual 3D space at the client side, the coordinates of the user along with inputs (e.g., keyboard and/or mouse activities) are collected and transmitted to the server, which determines the position and status of the user in the 3D space. As used herein, "status" can refer to whether the user is present in the 3D environment, their state of action, whether they are speaking or silent, a direction of their gaze, their head position, and/or a probable direction of gaze in the upcoming time steps. The rendering engine, which includes an output data channel of the server side and optionally includes (or uses data from) one or more graphics processing units (GPUs), is configured to adjust this position and status. A compute device of another user who has visual access (e.g., within the virtual 3D space/environment) to the user may receive data that is generated by the server side based on one or more parameter adjustment operations. Mutually between the users, the field of view (FOV), the angle of the perception and the distance are determined, for example by the server and/or by the users themselves by means of one or more peripheral inputs. The back end can contribute to/supplement the foregoing process by sending corrected and new video frames automatically or in response to one or more requests. The corrected and new video frames may contain altered viewpoints and angles, as well as additional changes to the eye movements of the mutual users. The eye movements, fixations and transitions are results of several factors, as explained below.

In some implementations, the server can take into account a mapping of a particular user's eye details and the manner in which the eye movements are perceived and transmitted by the camera of the compute device the user is using. The compute device may be, for example, a laptop, a desktop computer, a tablet, or a smartphone or other mobile compute device. The cameras of these devices may widely vary in their specifications, focal lengths, fields of view etc. Since each user's eyes are unique to them and since each compute device is unique, the mappings between the former and the latter are sufficiently accurate for the manipulations of the visual artifices and the eye gaze corrections subsequently performed. As such, a process of calibration can be used to achieve the desired adjustments/corrections. As discussed above, the calibration can include requesting that the user focus on a certain object on their screen, and move their eye(s) with the object while concentrating as the object moves. The positions and eye movements of the user are collected by the camera and the front end device, and transmitted to the server, where several computations later the calibration data is stored in the form of a camera calibration matrix. The foregoing process, described as being performed by one user, can be performed for multiple (e.g., several hundred) users concurrently or overlapping in time, and the computing load can be borne by a graphics processing unit (GPU) cluster deployed on the server side of computers. The GPU cluster can be configured to perform machine learning for gaze estimation and/or gaze redirection, for example to generate predictions in an accelerated manner.

In some implementations, what the server outputs to the rendering engine is a sequence of new video frames or packets that are curated in accordance with the user's region of interest (e.g., present or past) and/or one or more heuristics, and that represent evened-out results of the user's eye movements and transitions, generating the perception of eye contact between users, or perceive someone's attention is elsewhere, with the present scenario effectively communicated, and with a probability of shifting of gaze being communicated, thus ensuring a smooth transition. The sequence of video frames or packets can be used to interpret the user's attention (e.g., what/who the user is paying attention to and/or looking at). The back end computing system has the capacity, due to computing routines and algorithms, to predict the next region of interest of a certain user at the client side. The next region of focus of the user can be predicted with an accuracy that depends on the region(s) on which the user was focusing several consecutive time instants earlier. The accuracy can also depend on the size of the video tile, which is proportional to the distance at which the area of focus was in the past. For example, suppose a user's web camera captures a set of frames at times $t_0, t_1, \ldots t_n$, encodes them, and sends them to the system's server(s). As with all real-time systems, there can be latency associated with the transmission. Each frame from the set of frames can include a different gaze scenario for a given "observer" user (e.g., instances of a user switching their gaze), so each frame is analyzed to predict where that observer user's attention was (i.e., what they were looking at) for each moment in (or snapshot of) time. During these moments in time, there can be participants in front of the observer user who vary with regard to their distance away from the observer user. For those participants who are closer to the observer user, it may be easier for the machine learning model(s) to predict that the observer user is actively looking at them, since those participants occupy more space on the observer user's screen, and thus have a larger field of view. Participants who are further away from the observer user will occupy less space on the observer user's screen, however it is possible that the observer user is looking at this distant user. To detect that the observer user's attention has been routed to, or has switched to, this distant user, the distant user may be assigned a field of view that is proportionally larger than the nearby participants. For example, a distant user could be granted a field of view that is 2× the size of their video tile, whereas a nearby user might only have a field of view that is less than 1× the size of their video tile.

In some embodiments, the system uses a convolutional mathematical function that takes into account the visual field algebra of the user, the gaze vector of the user, the camera calibration parameters, the heuristic inference of several users of the past acquired from the server-side database, and/or the recent gaze history of the user. Visual field algebra can include parameters such as the distance between an observer and an observed, the spread angle of the viewer's eyes, the perspective view parameters with respect to the 3D intuition of the viewer, and the relative distance between the several objects in the user's visual field.

In addition to eye movement adjustments and area of interest adjustments, the eye gaze redirecting system can also take into account differences between the actual eye movements captured by the 2D camera and the way the eye movements are represented in the 3D environment in which the clients engage, for example during chat sessions. For example, the angular span (a specific measure of field of view) of a user as detected by that user's device camera may not always be well-represented or faithfully represented in the 3D environment. due to under-scaled reproduction thereof. For this reason, in some implementations, the angular span of the client's eye movement is adjusted (e.g., magnified) by a convenient factor which is also dependent on the distance the client is located from his own camera.

The ecosystem thus far described is a robust network of providing, for a multitude of users who are logged in for a chat session at a given time/instant, a seamless, realistic and natural communication feeling due to the corrected eye gaze(s), designed in accordance with the specifications of the 3D visual field of each and every participant of that chat session.

System Block Diagram (FIG. 11)

FIG. 11 shows a system block diagram associated with an eye gaze adjustment system, according to an embodiment. FIG. 11 includes a first server compute device 1100, a second server compute device 1102, user 1 client compute device 1130, and user 2 client compute device 1140, each communicably coupled to one another via networks 1120*a*, 1120*b* (which may be the same or different network(s), collectively referred to hereinafter as "network 1120").

In some implementations, the network 1120 can be any suitable communications network for transferring data, operating over public and/or private networks. For example, the network 1120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 1120 can be a wireless network such as, for example, a Wi-Fi or wireless local area network ("WLAN"), a wireless wide area network ("WWAN"), and/or a cellular network. In other instances, the communication network 1108 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network 1120 can be encrypted or unencrypted. In some instances, the communication network 1120 can include multiple networks or subnetworks operatively coupled to one another by, for example, network bridges, routers, switches, gateways and/or the like (not shown in FIG. 11).

The user 1 client compute device 1130 can include a processor, memory, camera(s), peripherals, and display, each communicably coupled to one another (e.g., via a system bus). The user 2 client compute device 1140 can similarly include a processor, memory, camera(s), peripherals, and display, each communicably coupled to one another (e.g., via a system bus). Each of the first server compute device 1100 and the second server compute device 1102 can include a processor operatively coupled to a memory (e.g., via a system bus). The second server compute device 1102 includes a rendering engine 1110, as described herein.

The processors can be, for example, a hardware based integrated circuit (IC) or any other suitable processing device configured to run and/or execute a set of instructions or code. For example, the processors can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processors can be configured to run any of the methods and/or portions of methods discussed herein.

The memories can be, for example, a random-access memory (RAM), a memory buffer, a hard drive, a read-only memory (ROM), an erasable programmable read-only memory (EPROM), and/or the like. The memories can be configured to store data used by the processors to perform the techniques discussed herein. In some instances, the memories can store, for example, one or more software programs and/or code that can include instructions to cause the processors to perform one or more processes, functions, and/or the like. In some implementations, the memories can include extendible storage units that can be added and used incrementally. In some implementations, the memories 1104, 1134, 1144 can be a portable memory (for example, a flash drive, a portable hard disk, and/or the like) that can be operatively coupled to the processors. In some instances, the memories can be remotely operatively coupled with a compute device (not shown in FIG. 11).

The peripherals can include various input and/or output devices. In some implementations, the peripherals include cameras. The cameras can be used to capture images and/or video of users 1 and 2 (respectively). The cameras can be, for example, an external web camera or a camera housed within a desktop, laptop, smartphone, tablet, and/or the like. In some implementations, the cameras are configured to capture video that includes the face of users 1 and 2. In some implementations, the cameras are configured to capture video that includes both eyes of users 1 and 2. The peripherals can each also include a device(s) such that users 1 and 2 can control their respective virtual representations in a virtual environment, such as a mouse, keyboard, game controller, and/or the like.

The displays can include any type of display, such as a CRT (Cathode Ray tube) display, LCD (Liquid Crystal Display) display, LED (Liquid Emitting Diode) display, OLED (Organic Light Emitting Diode) display, and/or the like. The displays can be used for visually displaying information (e.g., data) to users U1 and U2, respectively. For example, a display of user 1's client compute device 1130 can display a virtual representation of user U2 in a virtual environment to the user U1, and a display user 2's client compute device 1140 can display a virtual representation of user U1 in the virtual environment to user U2. The displays can each include one or more displays. For example, the display of user 1's client compute device 1130 and/or or user 2's client compute device 1140 may include dual monitors.

User 1 may use user 1 client compute device 1130 to enter a virtual environment, where user 1 can be represented via a virtual representation (e.g., video pane of user 1). User 2 may use user 2 client compute device 1140 to enter a virtual environment, where user 2 can be represented via a virtual representation (e.g., video pane of user 2). If, in the virtual environment, user 1's virtual representation looks in the direction of user 2's virtual representation, user 1 will see user 2's virtual representation via the display of user 1's client compute device 1130. If, in the virtual environment, user 2's virtual representation looks in the direction of user 1's virtual representation, user 2 will see user 1's virtual representation via the display of user 2's client compute device 1140.

The memory of the first server compute device 1100 can include a representation of eye data. The eye data can be associated with user 1, and represent eye data of user 1 via a calibration process. The calibration process can include the display of user 1's client compute device 1130 displaying an object on one or more locations, and a camera included in a peripheral of user 1's client compute device 1130 capturing images and/or video of user 1 during the displaying of the object. As such, the eye data can include indications of user 1's gazes when objects are at various locations on the display. The eye data can be received at the first server compute device 1100 from user 1's client compute device 1130, for example via one or more webcam streams.

The memory of the first server compute device 1100 can also include a representation of video frames without gaze correction. The video frames without gaze correction can refer to video captured of user 1 via the camera included in the peripherals of user 1's client compute device 1130 while a virtual representation associated user 1 is in a virtual environment. For example, the video frames without gaze correction can refer to video captured of user 1 while user 1 is in a virtual meeting. The video frames without gaze correction can be received at the first server compute device 1100 from user 1's client compute device 1130.

The memory of the first server compute device 1100 can also include a representation of a processing pipeline. The processing pipeline can be configured to receive input and output engineered video frames with gaze correction 1112. In some implementations, input to the processing pipeline to generate the video frames with gaze correction 1112 can include the eye data and video frames without gaze correction. For example, video frames without gaze correction can be used to determine a gaze (e.g., eye position) of user 1, and the eye data can be used to determine where on the display of the user 1's client compute device 1130 user 1 is looking based on their gaze. A new target gaze can then be determined, for each video frame from the video frames without gaze correction, indicating how a gaze of user 1's virtual representation should be modified for that video frame. In some implementations, at least one generative adversarial network (GAN) included in the processing pipeline can receive each video frame from the video frames without gaze correction and target gaze associated with the video frame to generate a video frame with gaze correction that is included in the video frames with gaze correction 1112. The video frames with gaze correction 1112 can be similar to the video frames without gaze correction, except that a gaze of user 1 in the video frames with gaze correction 1112 can be different from the gaze of user 1 in the video frames without gaze correction.

Depending on the location and field of view of each user in a given virtual environment, different users (e.g., user 2) will see a different angular perspective (i.e., side) of user 1 at the user 1's virtual representation in the virtual environment. For example, one user may see user 1's virtual representation showing a left side of user 1's face, while a different user may see user 1's virtual representation showing a right side of user 1's face. As such, modified video frames can be generated based on the video frames with gaze correction 1112. The modified video frames show the virtual representation associated with user 1 having a corrected/modified gaze, and at an angular perspective(s) of user 1 that considers the location and/or field of view of user 1's virtual representation and the location and/or field of view of a user's virtual representation viewing user 1's virtual representation. For example, where user 1's virtual representation is located to the left of user 2's virtual representations, video frames without gaze correction may represent user 1 looking to the left, video frames with gaze correction 1112 may represent user 1 looking to the right, and the modified video frames can represent the right part of user 1 as user 1's virtual representation is looking to the right. The modified video frames can then be sent from the first server compute device 1100 to the second server compute device 1102 (see "client 1 & 2 augmented video" in FIG. 11), and then forwarded from the rendering engine 1110 of the second server compute device 1102 to user 2's client compute device 1140, where the modified video frames are displayed via the display of user 2's client compute device 1140 so that user 2 can see user 1's virtual representation with the modified gaze and appropriate angular perspective.

Although not explicitly shown in FIG. 11, a similar process to that described above about user 2 viewing user 1's virtual representation with modified video frames can occur at server compute device 1100 such that user 1 can view modified video frames of user 2's virtual representation having a modified gaze and angular perspective. Additionally, although FIG. 11 is discussed with respect to two users, two virtual representations, and two compute devices, any other number of users, virtual representations, and/or compute devices can be used. These other users, virtual representations, and/or compute devices can also view the virtual representations of users 1 and/or 2 with the modified gaze and angular perspective. Additionally, although certain representations of data are described herein as being stored in the first service compute device 1100 (e.g., eye data, video frames without gaze correction, video frames with gaze correction, etc.), in some implementations, such data can be stored in a different compute device (e.g., second server compute device 1102) as an alternative to, or in addition to, the first service compute device 1100.

Figure 12A:
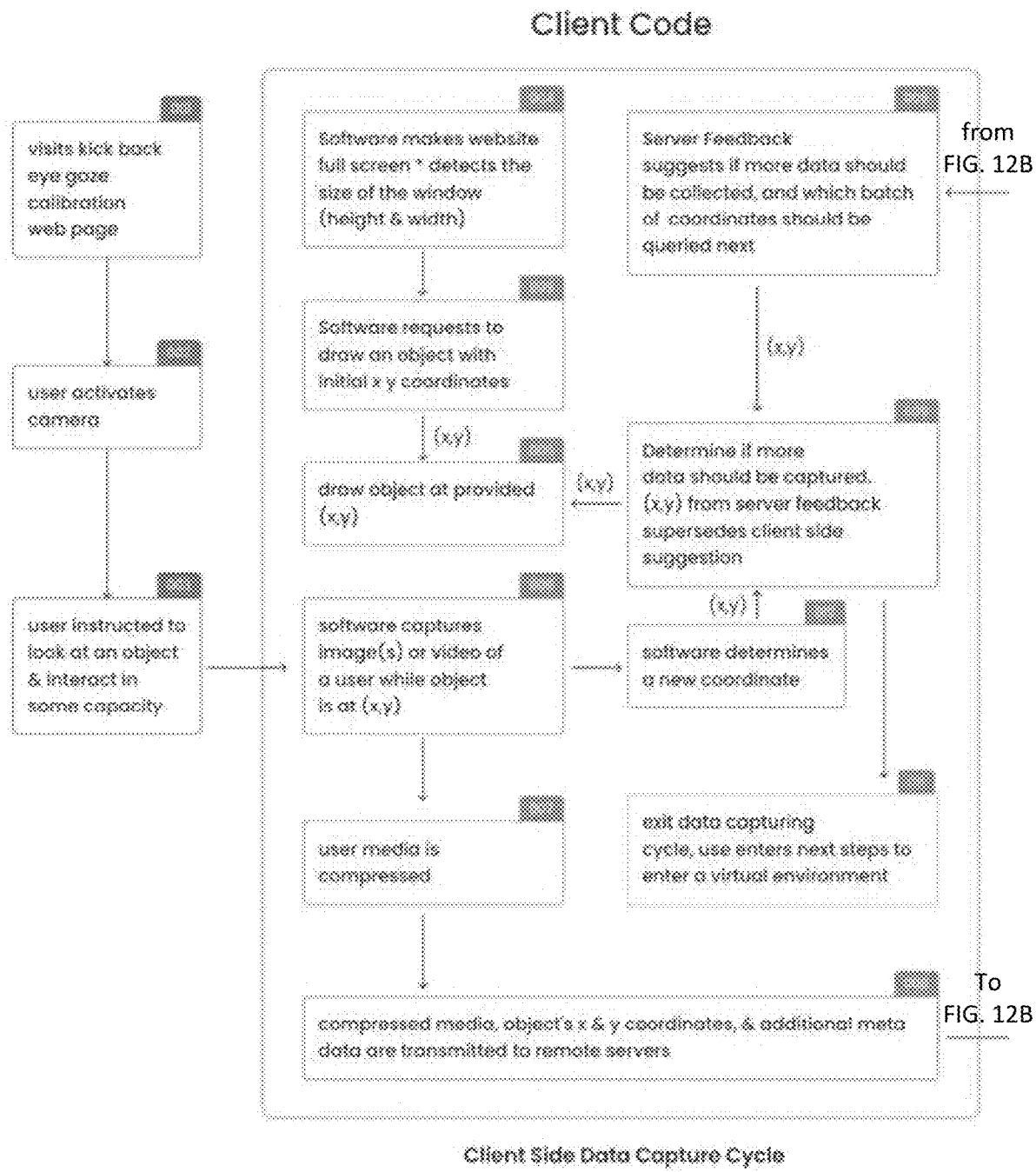
FIGS. 12A-12B show client side and server side computing systems dedicated to user specific calibration, and their associated eye gaze adjustment processing flow, according to an embodiment.
Figure 12B:
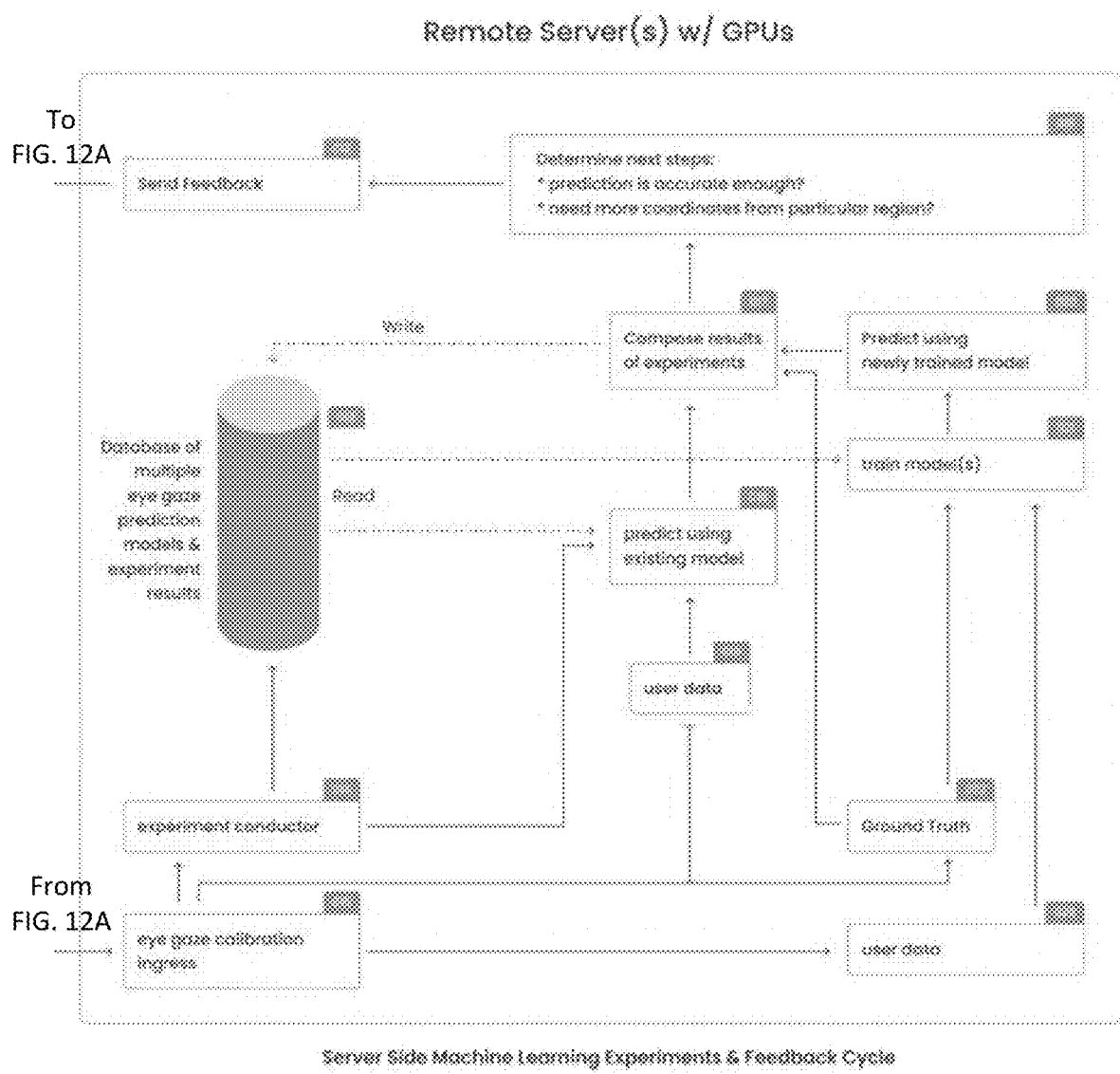

Data Flow Through System Architecture (FIGS. 12A-12B)

The eye gaze estimation and redirection engine (collectively referred to herein as the gaze adjustment engine) can take inputs/contributions both from the client side (e.g., user 1 compute device 1130 and/or user 2 compute device 1140) and the server side (e.g., service compute device 1100). Components of FIGS. 12A-12B can be implemented in hardware and/or software. Gaze estimation can include computation of the position vector (i.e., gaze vector) centered at the pupil of the subject's eye, which can be analogous to the normal vector of a three-dimensional curved surface whose radius of curvature is equal to that of the pupil. Redirection is the process of changing the values of the gaze vector at will/as desired. Together, estimation and redirection form the core components of the maintenance of eye contacts of the users of Kickback.space™. A subject looking straight into the camera of his device is expected to hold a zero gaze vector, owing to the fact that his pupilar normal is inline with the camera normal. There are, however, several situations in which this straightforward inference fails due to camera lens distortions, user eye asymmetry, squint, radius parameters and other anomalies intended or unintended.

A client side compute device can be a computer or a mobile device operated by an individual 001 who has access to the Kickback.space™ services through his web browser (and/or application). It is possible that there are hundreds of clients/users co-existing at the start of an event. If some of them are first-timers, they can go through the eye gaze adjustment routine to register their uniqueness in the system. The uniqueness of each user can be (but may not be required to be) determined in greater detail than is typically involved in known facial recognition, pupil identification or thumb print biometric systems, in that the users may undergo an additional exercise for documenting their eye topology, geometry and morphology.

The server side includes the coordinated and orchestrated computing resources (optionally deployed in the cloud), allotted at a given time to the eye gaze adjustment routines, and works in unison with machine learning (ML) inference engines, a database of multiple eye gaze prediction models, a database of experimental results, a model database, and collections of client side responses and requests. The communication from the server to the client can be in the form of feedback regarding the various eye gaze parameters of interest. The communication from the client to the server predominantly contains compressed media and meta data.

Client Side

In some embodiments, camera calibration is performed because a camera-to-virtual world correspondence is a one-to-one functional relationship, unique to a camera, dependent on the 3D system rendered remotely to a display, and on the user's eyes. The camera-to-virtual world correspondence can vary depending on the distance a user is positioned from the camera, the display size, its aspect ratio, the user's speed of shifting gaze and/or other individual morphological features of the user's eyes.

Turning to FIGS. 12A-12B, the user, upon access to the client side interface of Kickback.space™ on their computer (e.g., via a webpage, as shown at 001 of FIG. 12A), is instructed to calibrate his eye with respect to the device camera (activated at 002), if he is a first-timer as notified by the server via the client. As a first step of camera calibration, the user is prompted (at 003 of FIG. 12A) by the system (e.g., Kickback.space™) after authentication, to respond to visual/textual cues with regard to an object on the screen, created by the gaze adjustment routines.

Kickback.space™ makes the webpage full-screen and detects the size of the window at 004. The front end of Kickback.space™ can also be referred to as the interface. The interface requests that the user draw an object at initial coordinates (x, y) on their screen, and captures, at 006, the images or videos of the user while the object is at (x, y) 005. Then the interface moves the object to a new coordinate (x, y), at 010, which the user is next prompted to focus on. This prompt-response-capture cycle is repeated until there is a sufficient number of observations, which is decided by the server feedback 009.

When this cycle ends at 009, user data is captured in a compressed format, containing the coordinates $(x_i, y_i)|i=1, 2 \ldots N$ of the object location at N captures and resultant metadata 008, and transmitted to the remote servers. The user is then prompted to exit the gaze capture cycle, at 011, to move to the next step.

Server Side

A functionality of the server side computing in the gaze adjustment engine is to arrive at a heuristically balanced outcome, which compounds the uniqueness of the eye gaze of an individual user with a robustly evolving machine learning model.

On the server side, the eye gaze calibration ingress 015 is transmitted to a group of computers, from any number of clients who are actively engaged with calibration at that instant/time. These computers, in turn, send feedback 012 to the respective client computers, the feedback including parameters for use in deciding (e.g., at 016) whether further data measurements are desirable, depending on the accuracy of the ingress data and the sufficiency of co-ordinates $(x_i, y_i) |i=1, 2 \ldots N$, from a particular region in the 3D space.

The server side computing resource determines these parameters based on the outcome of experiments conducted, which are resultants of the compound factor involving a prediction using an existing model at 018 and a prediction using a newly-trained model at 020. The former is obtained by compounding user data 019, 023 and data from an experiment conductor, which uses the user eye gaze calibration ingress and data from a database of gaze prediction results. The ingress is used to train one or more prediction models at 021 based on the user data and by coupling with ground truth data 022, and/or to make predictions using existing models of eye gaze correction/redirection. The foregoing is executed by an experiment conductor 014 module by using data from a database of multiple eye gaze prediction models and experimental results. The data queried from the database to which the composed experimental results 017 are updated can also be used to train models. The predicted models are updated and written to the database 013 after the results of the experiments are composed 017. The gaze correction can depend on the ML-inferred gaze vector, which may be a resultant of earlier model computations.

Figure 13A:
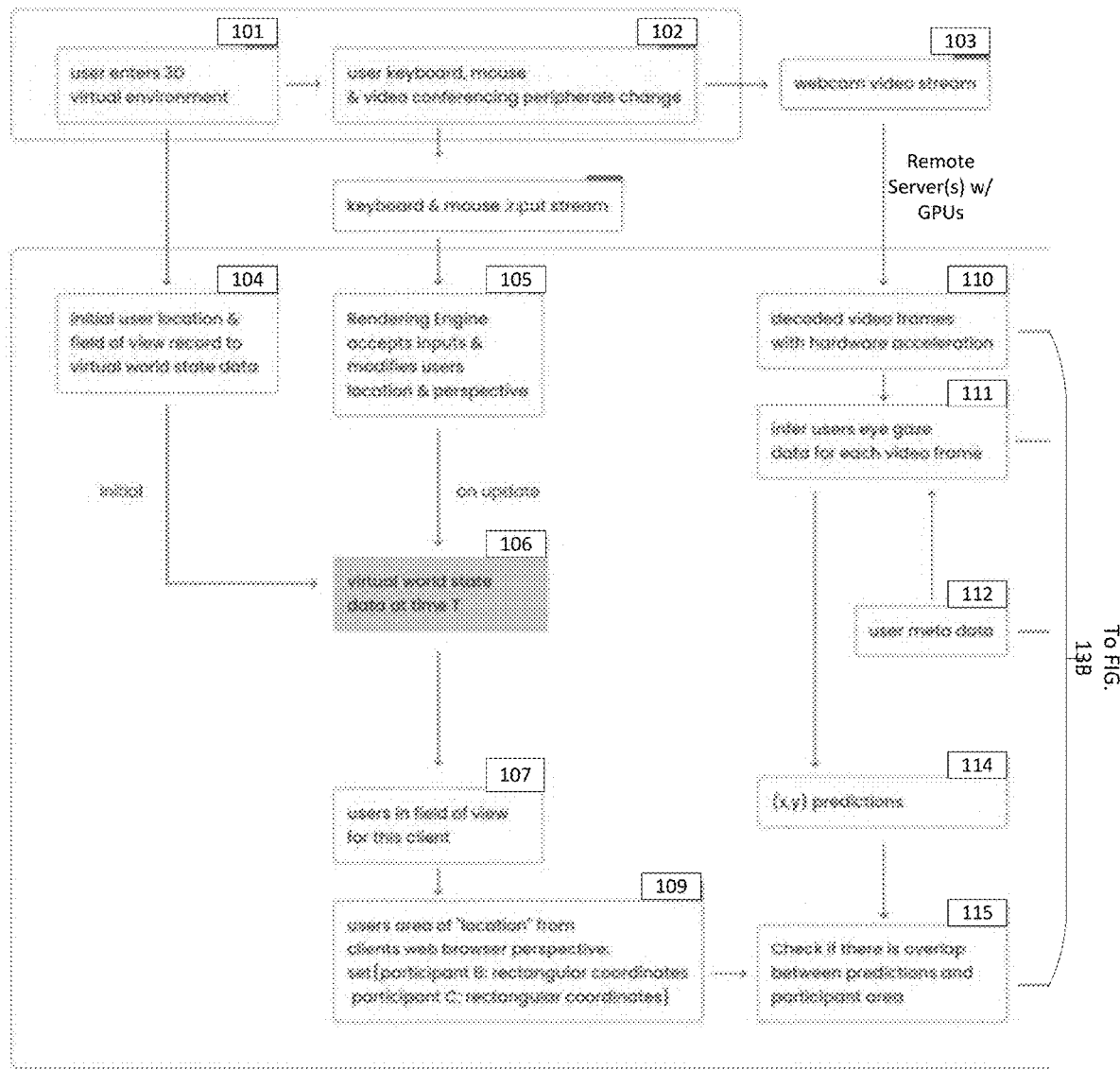
FIGS. 13A-13B show a data flow through an algorithmic framework post-calibration, and how the eye gaze adjustment is dependent on prediction(s) of a given user's attention/gaze to other users, according to an embodiment.
Figure 13B:
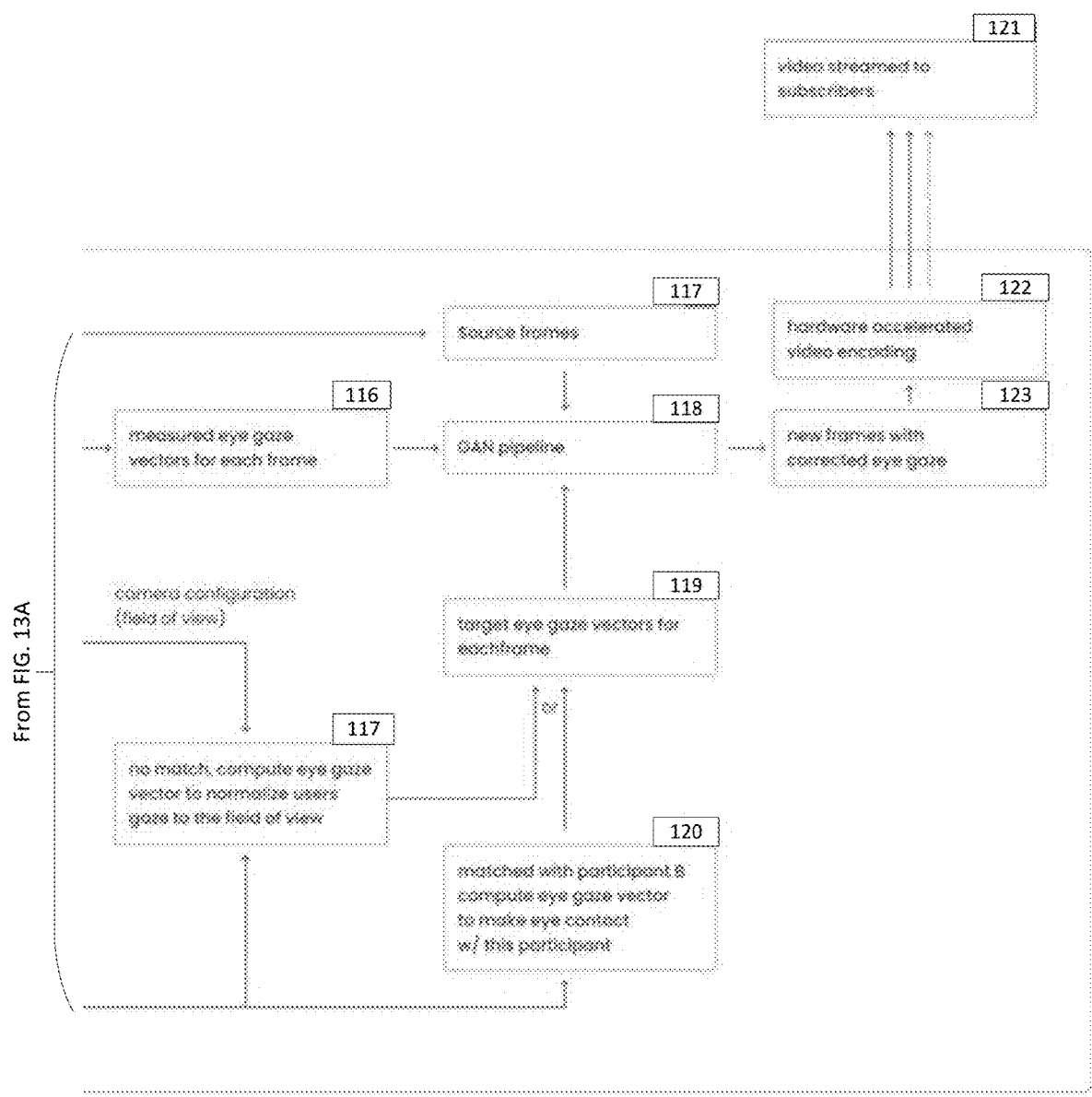

Operations Layer of System Architecture (FIGS. 13A-13B)

In some embodiments, a cluster of one or more servers deployed in the cloud is configured to perform eye gaze correction and redirection by receiving data that includes client-side web cam stream data and/or input data (e.g., keyboard and/or mouse response data), and outputs video frames containing corrected gaze(s) of the user 101. When a user enters the 3D virtual world, their webcam video stream data 103 and their keyboard and/or mouse inputs 102 are gathered by the services and transmitted to a remote server equipped with GPUs. The initial location 104 of the user and their field of view with respect to the virtual world state data are taken as references.

Using the keyboard and/or mouse inputs, the rendering engine 105 is configured to accept and modify the user's location and perspective. The web video camera stream, in the form of raw data, is decoded into video frames 110 with hardware acceleration. The transmitted data defines the state of the user in the virtual world at time T (106). The users in the field of view (FOV) of a given user are presented to that user as a function of their area of location A within the virtual world 106 and the user's location $(x, y, z)$ in their field of vision 107. The decoded video frame data is used to obtain the user's eye gaze attention for each video frame by utilizing the user metadata and predicting the $(x, y)$ location of the gaze. The user metadata 112 is also used to determine the camera configuration or the field of view.

The source frames from the video are inputs to a GAN pipeline along with the measured 116 eye gaze vector 117 and the target eye gaze vector 119 for each video frame. The output of the GAN pipeline 118 is a set of new frames 123 with the corrected eye gaze vector, which is then encoded with hardware acceleration. The target eye gaze vector for each frame is composed by deciding between two factors. If there is an overlap 115 between the prediction 114 and the participant area, say for example participant B, the eye gaze vector orients to perfectly point to participant B, and then the eye gaze vector is re-computed to make eye contact with the participant. If there is no match 117, the gaze vector is computed to normalize the user's gaze to the field of view. The final gaze corrected video frames are then transmitted to the subscribers 121 after proper hardware accelerated video encoding 122.

Camera-to-User Eye Relationship Calibration Example (FIG. 14)

In this example, the diagram shows the screen state at times $t_0$ 200 and $t_1$ 201, respectively. The object starts moving from the top left corner of the screen (in other steps it can move in various directions), and is focused on by the user at $t_0$, who continues to look at and follow the object, as it moves to the bottom right $t_1$. The object can keep hovering throughout the screen until signals from the server cause the cycle to end. In some embodiments, the user can be requested to click or trace the object as it moves or remains static, to collect the cursor coordinates $(x_{cu}, y_{cu})$ in conjunction with the coordinates $(x_{obj}, y_{obj})$ of the drawn object. The object drawn can be static or dynamic upon certain user inputs, or it can be constantly moving around the screen, e.g., a bouncing ball that reacts to edges or key inputs. The interface also provides a multi-screen (202, 203) calibration option, which can perform the foregoing routine regardless of the number of displays or orientation of displays the user(s) may have.

Figure 15:
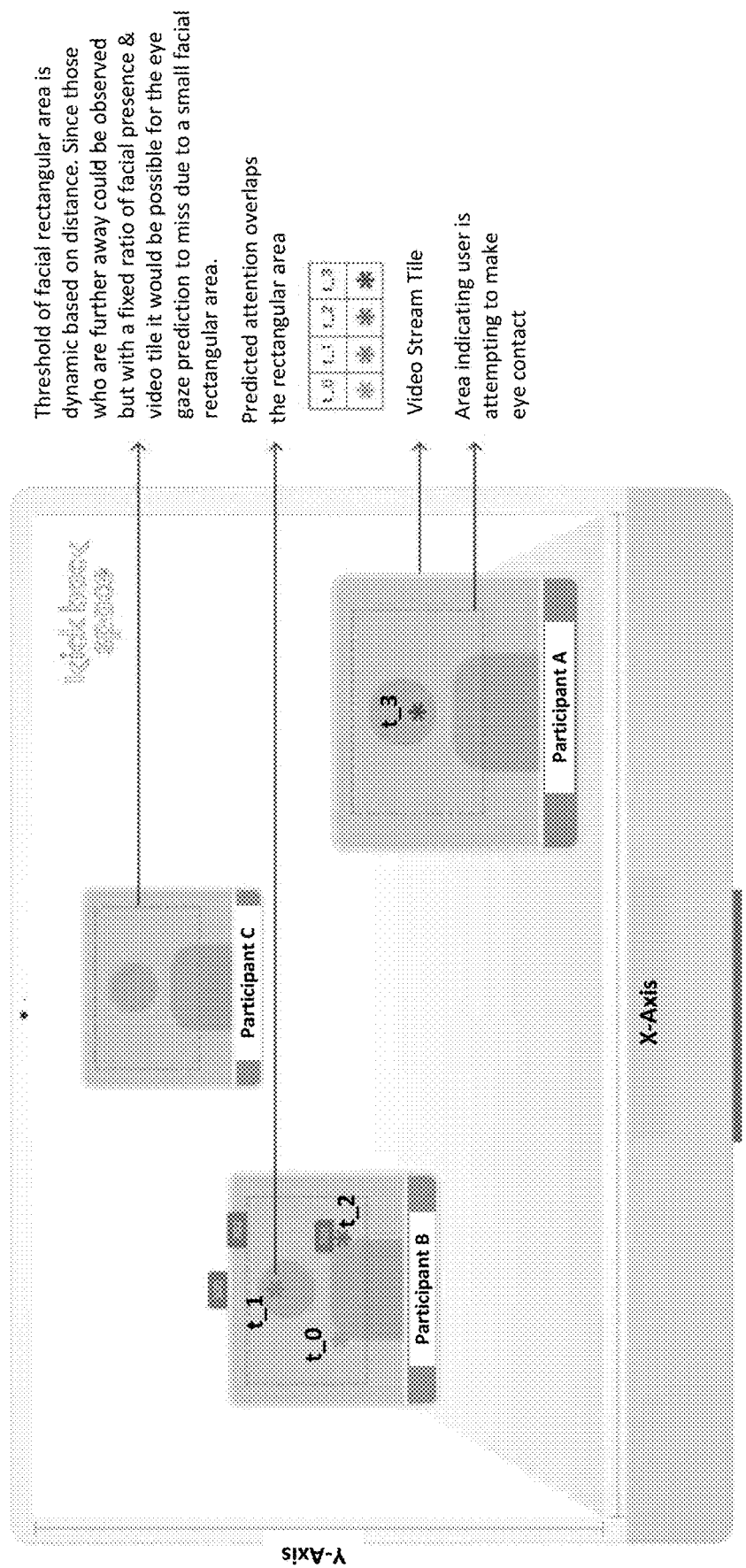
FIG. 15 shows rectangular facial areas and their role in the determination of the eye gaze vector present and past data to guide adjustments to the eye gaze vector to represent eye contact with a first participant, followed by a second participant, according to an embodiment.

Probabilistic Prediction of Future Area of Interest in 2D Planar Coordinates (FIG. 15)

Given a scenario (shown in FIG. 15) in which three participants A, B and C are within the field of view of a user (or "client user"), within a time interval, suppose the user is viewing/focusing on participant B's face and shoulder for the first three video frames, and then switches to viewing/focusing on participant A's face in the fourth (last) frame. The area of the video stream tile can be represented as $A_{user}^{tile}$ and the facial rectangular area be $A_{user}^{frect}$. The $user$ subscript can be $_A$, $_B$ or $_C$, depending on the user concerned. Since the $A_{user}^{frect}$ is in proportion to $A_{user}^{tile}$, and $A_{user}^{tile}$ varies with the Z-distance in the 3D virtual space, there is a chance that the gaze of the user, when focuses on participant C, may be missed. The Z-distance is inward normal to the screen, and at a design level is assumed to be the focus priority of the client user being given to the participant(s). In FIG. 15, amongst participants A, B and C, the client user has given a priority of focus to participants in that same order (e.g., as evaluated on a per frame basis). Thus, the accuracy of eye gaze correction at any given time due to this phenomenon can be given by $$\epsilon_{user} = \zeta(A_{user}^{tile}, A_{user}^{frect}, Z, t, \Phi(v_{user_s}, \phi_{user_s}))$$

The function ϕ is unique to a client user, and cannot be determined by closure ("closure" referring to a system of consistent equations that can be solved analytically or numerically, and that does not require any more data other than the initial boundary conditions of the system), even by empirical evaluations. Rather, the function ϕ is a heuristic component that can be continuously updated by ML inference from the server feedback. The subscript "s" represents primarily high velocity, conjugate movements of the eyes known as saccades. When the head is free to move, changes in the direction of the line of sight can involve simultaneous saccadic eye movements and movements of the head. When the head moves in conjunction with the eyes to accomplish these shifts in gaze direction, the rules that helped define head-restrained saccadic eye movements are altered. For example, the slope relationship between duration and amplitude for saccadic eye movements is reversed (the slope is negative) during gaze shifts of similar amplitude initiated with the eyes in different orbital positions.

The probability that a $_{user}$ could be the next focus (at time state t+1) of the client user, which depends on the ratio of the number of times that the client user shifts focus in the previous time state t, is given by:

$$P_{t+1}(U_i) = 1 - \sum_{i=0}^{N} \frac{N_t(U_i)}{N_t(U)}$$

Figure 16:
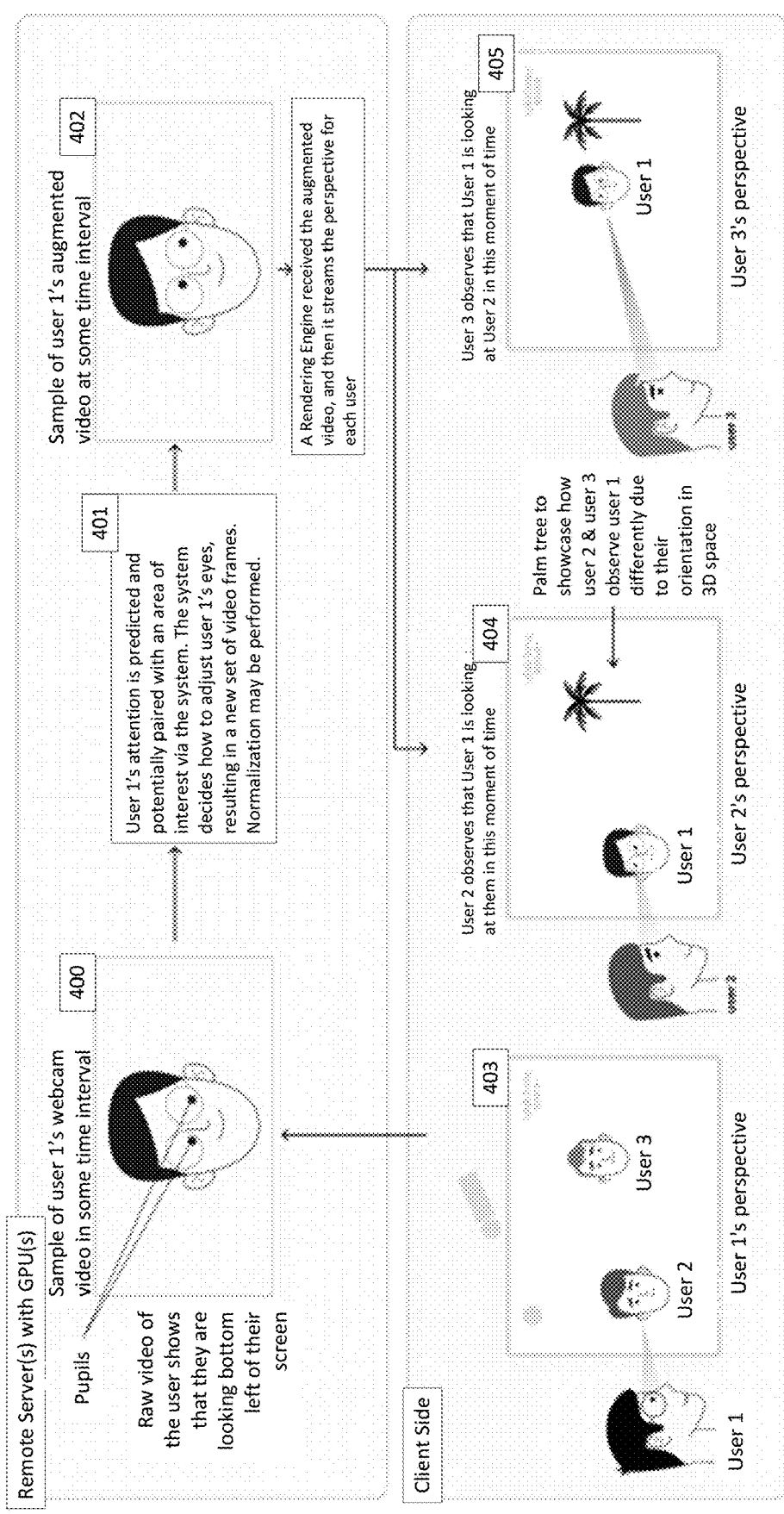
FIG. 16 shows server side computing methods designed to give the user and the other clients different perspectives of the respective user, according to an embodiment.

Backend Conversion of Probable Areas of Interest and Gaze into Spatial Coordinate Data (FIG. 16)

Video frames with users focusing on a certain irrelevant portion of the screen 400 are to be processed by the backend systems 402 to focus on a region of higher probability of natural attention. The latter region is chosen by ML inference and the previously described factors. The augmented video 402 with the gaze direction changed includes several video frames across which the gaze is adjusted to focus in a certain integral equilibrium to the region of probable attention. The augmented video frames are compounded images with the user eye features and the ML model substituting the gaze vector on the eye ball, thus resulting in a realistic eye movement. A rendering engine receives these video frames and then streams the perspective for each user participating in the chat/conference.

In the user head figures shown, user 1 is looking at his screen and can observe users 2 and 3. The following two screens belong to users 2 and 3, respectively. The gaze of the user 1 as perceived by the user 2 and 3 is modified enough that they two can tell where user 1 is currently looking. 403 With the palm tree in the figure as a reference object, due to the differing positioning of the users within the 3D world 405, the palm tree is visible to the respective users at different projection planes, but user 2 observes that user 1 is looking at them, and user 3 observes user 1 is currently not looking at them.

Normalizing Eye Gaze Redirection in the Spatial Coordinate System (FIGS. 17A-17B)

The eye gaze can be adjusted to reflect the field of view for an "in-space camera." Virtual environments can be rendered via one or more rendering engines, and each user has their own perspective within the virtual environment. The rendering engine(s) deploy in-space cameras to render perspectives for each individual user. Each user who joins the virtual environment can have their own associated in-space camera, and each in-space camera can have its own associated properties that may differ from others of the in-space cameras. The actual field of view depends on the distance between the user and the monitor, as well as the size of the monitor. In a case of 45 degree field of view for a given user, consider an in-space camera that captures the perspective of this user with the assumption that the field of view within the virtual environment is greater than what we perceive in the real life, for instance ranging from 90 degrees to 260 degrees. When the actual prediction is 45 degrees and the camera configuration is 135 degrees, a normalizing ratio of 3 is obtained. The movement of the eyes of the user is thus exaggerated by a factor of 3 whenever there is a shift in their gaze, and whenever the eyes are off-center, the gaze is normalized and exaggerated by a factor of 3.

Methods

FIG. 18 shows a flowchart of a method 800 for eye gaze adjustment, according to an embodiment. In some implementations, method 800 can be performed by a processor (e.g., processor 102).

At 801, a signal representing eye data (e.g., eye data 106) associated with at least one eye of a first user (e.g., user 1) is received at a first compute device (e.g., user 1 compute device 130) and from a second compute device (server compute device 100). At 802, a determination is made, in response to receiving the signal representing the eye data, that the eye data is sufficient to perform gaze direction correction for the first user. In some implementations, 802 happens automatically (e.g., without requiring human intervention) in response to completing 801. At 803, a signal indicating that the eye data is sufficient to perform the gaze direction correction is sent to the second compute device. In some implementations, 803 happens automatically (e.g., without requiring human intervention) in response to completing 802.

At 804, a signal representing a first video frame (e.g., included in video frames without gaze correction 108) of the first user is received from the second compute device. At 805, a gaze direction of the first user in the first video frame is estimated using the eye data. In some implementations, 805 happens automatically (e.g., without requiring human intervention) in response to completing 804.

At 806, a field of view of a first virtual representation of the first user in a virtual environment is determined. The first virtual representation is (1) based on an appearance of the first user and (2) controllable by the first user. For example, the first virtual representation can include a video plane of the first user. At 807, the gaze direction of the first user in the first video frame and the field of view of the first virtual representation is compared to predict a target gaze direction for the first user. In some implementations, 807 happens automatically (e.g., without requiring human intervention) in response to completing 806.

At 808, representations of the first video frame, the gaze direction of the first user, the target gaze direction, and a normalizing factor are input into a processing pipeline (e.g., processing pipeline 110) to generate a second video frame (e.g., included in video frames with gaze correction 112). A gaze direction of the first virtual representation in the second video frame is different from the gaze direction of the first user in the first video frame. In some implementations, 808 happens automatically (e.g., without requiring human intervention) in response to completing 807.

At 809, a modified video frame that represents the first virtual representation from a perspective of a second virtual representation in the virtual environment is generated using the second video frame. In some implementations, 809 happens automatically (e.g., without requiring human intervention) in response to completing 808.

At 810, the modified video frame is caused to be displayed in the virtual environment, at a third compute device (e.g., user 2 compute device 140), and to a second user (e.g., user 2) associated with the second virtual representation. Causing display can include sending an electronic signal to the third compute device, the third compute device configured to display the modified video fame in the virtual environment (e.g., a video plane in the virtual environment) in response to receiving the electronic signal. In some implementations, 810 happens automatically (e.g., without requiring human intervention) in response to completing 809

In some implementations of method 800, the second compute device is configured to (1) display (e.g., via display 138) an object for the first user to view, and (2) capture at least one of an image or a video that includes the at least one eye of the first user, the eye data based on the at least one of the image or the video. For example, the eye data can indicate how the at least one eye looked when the object was at a particular location when displayed.

In some implementations of method 800, the second compute device is configured to determine a size of at least one display of the second compute device, the eye data further based on the size of the at least one display. In some implementations, the size of the display can be used to determine the normalizing factor.

In some implementations of method 800, the comparing the gaze direction and the field of view to predict the target gaze direction for the first user includes determining that the gaze direction and the field of view at least partially overlap. In such a case, a gaze direction of the first virtual representation in the modified video frame is in a direction of the second virtual representation in the modified video frame (e.g., to indicate the making of eye contact). In some implementations, the comparing the gaze direction and the field of view to predict the target gaze direction for the first user includes determining that the gaze direction and the field of view do not at least partially overlap. In such a case, a gaze direction of the first virtual representation in the modified video frame is not in a direction of the second virtual representation in the modified video frame. In other implementations of method 800, a gaze direction is modified even if there is no overlap with a field of view of a virtual representation of another user. In some such cases, no comparison of the gaze direction and the field of view is performed. For example, a user may be looking at an object (e.g., the palm tree shown in FIG. 16), and a gaze direction of the first virtual representation (of that user) in the modified video frame can be in a direction of the palm tree.

In some implementations of method 800, the normalizing factor is determined based on (1) a field of view range of the first user relative to at least one display (e.g., one, two, three) of the second compute device and (2) a field of view range of the field of view of the first virtual representation. The field of view range of the first user relative to the at least one display is determined based on (i) a distance between the first user and the at least one display and (ii) a size of the at least one display.

Some implementations of method 800 further comprise receiving, prior to receiving the signal representing the first video frame of the first user, a plurality of images of the first user, each image from the plurality of images being an image of the first user taken at an associated angle from a plurality of different angles. Method 800 can further comprise determining a location of the first virtual representation during the determining of the field of view of the first virtual representation. Method 800 can further comprise determining a location of the second virtual representation during the determining of the field of view of the first virtual representation. Method 800 can further comprise determining a field of view of the second virtual representation during the determining of the field of view of the first virtual representation, where the modified video frame is generated based on representations of at least one image from the plurality of images, the field of view of the first virtual representation, the location of the second virtual representation, the location of the second virtual representation, and the field of view of the second virtual representation.

In some implementations of method 800, the determining that the eye data is sufficient to perform gaze direction correction for the first user includes: causing (1) the eye data and (2) database data that includes gaze direction perception models and experimental results, to be input into at least one machine learning model to generate an output; and determining that the output indicates that the eye data is sufficient to perform gaze direction correction for the first user.

In some implementations of method 800, the eye data associated with the at least one eye of the first user is a first eye data, the normalizing factor is a first normalizing factor, the modified video frame is a first modified video frame, and the method 800 further comprises receiving, from the third compute device, a signal representing second eye data associated with at least one eye of the second user. The method 800 further comprises determining that the second eye data is sufficient to perform the gaze direction correction for the second user. The method 800 further comprises sending, to the third compute device, a signal indicating that the second eye data is sufficient to perform the gaze direction correction. The method 800 further comprises receiving, from the third compute device, a signal representing a third video frame of the second user. The method 800 further comprises predicting, using the second eye data, a gaze direction of the second user in the third video frame. The method 800 further comprises determining a field of view of the second virtual representation. The method 800 further comprises comparing the gaze direction of the second user and the field of view of the second virtual representation, to predict a target gaze direction for the second user. The method 800 further comprises inputting the third video frame, the gaze direction of the second user, the target gaze direction, and a second normalizing factor into the processing pipeline to generate a fourth video frame, a gaze direction of the second virtual representation in the fourth video frame being different from the gaze direction of the second user in the third video frame. The method 800 further comprises generating, using the fourth video frame, a second modified video frame that represents the second virtual representation from the perspective of the first virtual representation. The method 800 further comprises causing the second modified video frame to be displayed in the virtual environment, at the second device, and to the first user.

In some implementations of method 800, the modified video frame is a first modified video frame, and method 800 further comprises generating, using the second video frame, a second modified video frame that represents the first virtual representation from a perspective of a third virtual representation in the virtual environment different from the second virtual representation. Method 800 can further comprise causing the second modified video frame to be displayed in the virtual environment, at a fourth compute device, and to a third user associated with the third virtual representation.

In some implementations of method 800, the first compute device is remote from the second compute device and the third compute device, and the second compute device is remote from the first compute device and the third compute device.

FIGS. 19A-19B show a flowchart of a method 900 for eye gaze adjustment, according to an embodiment. In some implementations, method 900 can be performed by a processor (e.g., processor 102).

At 901, a signal representing a first video frame (e.g., included in video frames without gaze correction 108) of a first user (e.g., user 1) captured at a first time is received at a first compute device (e.g., server compute device 100) and from a second compute device. (user 2 compute device 140). At 902, a first gaze direction of the first user in the first video frame is estimated. In some implementations, 902 happens automatically (e.g., without requiring human intervention) in response to completing 901.

At 903, a first field of view of a first virtual representation of the first user in a virtual environment is determined. The first virtual representation is based on an appearance of the first user. The first field of view includes a second virtual representation (e.g., of a second user or of an object or other feature) included in the virtual environment and does not include a third virtual representation of a third user included in the virtual environment. In some implementations, the virtual environment is an emulation of a virtual three-dimensional space (e.g., classroom, meeting room, stadium, etc.). In some implementations, 903 happens automatically (e.g., without requiring human intervention) in response to completing 902.

At 904, a determination is optionally made that the first gaze direction at least partially overlaps with the first field of view. In some implementations, 904 happens automatically (e.g., without requiring human intervention) in response to completing 903. At 905, optionally in response to determining that the first gaze direction at least partially overlaps with the first field of view, a second video frame (e.g., included in video frames with gaze correction 112 or modified video frames 114) that shows the first virtual representation looking at the second virtual representation and not looking at the third virtual representation is generated. In some implementations, 905 happens automatically (e.g., without requiring human intervention) in response to completing 904.

At 906, at a second time subsequent to the first time, the second video frame is sent to a third compute device (e.g., user 2 compute device 140) to cause the third compute device to display the second video frame within the virtual environment. In some implementations, 906 happens automatically (e.g., without requiring human intervention) in response to completing 905.

At 907, a signal representing a third video frame of the first user captured at a third time is received at the first compute device and from the second compute device. At 908, a second gaze direction of the first user in the second video frame is estimated. In some implementations, 908 happens automatically (e.g., without requiring human intervention) in response to completing 907. At 909, a second field of view of a first virtual representation in the virtual environment is determined. The second field of view includes the third virtual representation and not the second virtual representation. In some implementations, 909 happens automatically (e.g., without requiring human intervention) in response to completing 907.

At 910, a determination is optionally made that the second gaze direction at least partially overlaps with the second field of view. In some implementations, 910 happens automatically (e.g., without requiring human intervention) in response to completing 909. At 911, optionally in response to determining that the second gaze direction at least partially overlaps with the second field of view, a fourth video frame that shows the first virtual representation looking at the third virtual representation and not the second virtual representation is generated. In some implementations, 911 happens automatically (e.g., without requiring human intervention) in response to completing 910. At 912, at a fourth time subsequent to the third time, the fourth video frame is sent to the third compute device to cause the third compute device to display the fourth video frame within the virtual environment.

Some implementations of method 900 further include receiving, from the second compute device, a signal representing a fifth video frame of the first user at a fifth time. A third gaze direction of the first user in the fifth video frame is predicted. A third field of view of the first virtual representation in the virtual environment is determined, the third field of view including a virtual object that is not a virtual representation of a user. A sixth video frame that shows the first virtual representation looking at the virtual object is generated. At a sixth time after the fifth time, the sixth video frame is sent to the third compute device to cause the third compute device to display the sixth video frame within the virtual environment.

Some implementations of method 900 further include generating, optionally in response to determining that the first gaze direction overlaps with the first field of view, a fifth video frame that shows the first virtual representation looking at the second virtual representation. At the first time, the fifth video frame is sent to the second compute device to cause the second compute device to display the fifth video frame. Optionally in response to determining that the second gaze direction at least partially overlaps with the second field of view, a sixth video frame that shows the first virtual representation looking at the third virtual representation is generated. At the second time, the sixth video frame is sent to the second compute device to cause the second compute device to display the sixth video frame.

Some implementations of method 900 further include receiving a first set of eye data captured by the second compute device while eyes of the first user viewed an object on a display of the second compute device while the object was at a first location. A determination is made that the first set of eye data is not sufficient to perform gaze direction correction for the first virtual representation. A signal is sent to the second compute device indicating that the first set of eye data is not sufficient to perform gaze direction correction for the first virtual representation. A second set of eye data captured by the second compute device while eyes of the first user viewed the object on the display of the second compute device and while the object was at a second location different from the first location is received. A determination is made that the first set of eye data and the second set of eye data are collectively sufficient to perform gaze direction correction for the first virtual representation. A signal is sent to the second compute device indicating that the first set of eye data and the set of eye data are sufficient to perform gaze direction correction for the first virtual representation.

FIG. 20 shows a flowchart of a method 1000 for eye gaze adjustment, according to an embodiment. In some implementations, method 1000 can be performed by a processor (e.g., processor 102).

At 1001, a video stream (e.g., video frames without gaze correction 108) of a user (e.g., user 1) is received, each video frame from the video stream including a depiction of a gaze of the user. At 1002, for each video frame from the video stream, an estimated gaze direction of the gaze of the user in that video frame is determined substantially in real time as that video frame is received (e.g., in substantially real time). At 1003, for each video frame from the video stream, a field of view for a virtual representation associated with the user in a virtual environment is determined. In some implementations, 1003 happens automatically (e.g., without requiring human intervention) in response to completing 1002.

At 1004, for each video frame from the video stream, the field of view for the virtual representation associated with the user is optionally compared to the estimated gaze direction of the user to determine whether the field of view for the virtual representation associated with the user at least partially overlaps with the estimated gaze direction of the user. In some implementations, 1004 happens automatically (e.g., without requiring human intervention) in response to completing 1003.

At 1005, for each video frame from the video stream, an updated video frame (e.g., included in video frames with gaze correction 112 and/or modified video frames 114) including a modified gaze direction of the user different from the gaze direction of the user is generated, optionally based on the comparison of the field of view for the virtual representation associated with the user to the estimated gaze direction of the user. The modified gaze direction can be in a direction toward another person, object, or other feature within the field of view for the virtual representation associated with the user. In some implementations, the updated video frame is generated using a generative adversarial network (GAN). In some implementations, 1005 happens automatically (e.g., without requiring human intervention) in response to completing 1004.

At 1006, for each video frame from the video stream, the updated video frame is caused to be displayed. In some implementations, causing display can include sending an electronic signal representing the updated video frame to a compute device (e.g., user 2 compute device 140) configured to display the updated video frame in response to receiving the electronic signal. In some implementations, 1006 happens automatically (e.g., without requiring human intervention) in response to completing 1005.

Some implementations of method 1000 further include receiving a representation of eye data of the user, the representation generated using at least one of (1) a plurality of images of the user or (2) a video of the user, the determining of the estimated gaze direction of the user based on the eye data.

In some implementations of method 1000, the video stream is a first video stream, the user is a first user, the virtual representation is a first virtual representation associated with the first user, and method 1000 further includes receiving a second video stream of a second user, each video frame from the second video stream including a depiction of a gaze of the second user. Method 1000 further includes determining, for each video frame from the second video stream and substantially in real time as that video frame is received, an estimated gaze direction of the gaze of the second user in that video frame. Method 1000 further includes determining, for each video frame from the second video stream, a field of view for a second virtual representation associated with the second user. Method 1000 further includes generating, for each video frame from the second video stream and based on the field of view for the second virtual representation and the estimated gaze direction of the second user, an updated video frame including a modified gaze direction of the second user different from the gaze direction of the second user. Method 100 further includes, for each video frame from the second video stream, causing the updated video frame to be displayed.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a graphics processing unit (GPU), a controller, a microcontroller, a state machine and/or the like so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   receiving, via a processor of a first compute device and from a second compute device, a signal representing a first video frame of a first user;
   estimating, via the processor and using eye data associated with at least one eye of the first user, a gaze direction of the first user in the first video frame;
   determining, via the processor, a field of view of a first virtual representation of the first user in a virtual environment;
   comparing, via the processor, the gaze direction of the first user in the first video frame and the field of view of the first virtual representation, to predict a target gaze direction for the first user;
   inputting, via the processor, representations of the first video frame, the gaze direction of the first user, the target gaze direction, and a normalizing factor into a processing pipeline to generate a second video frame, a gaze direction of the first virtual representation in the second video frame being different than the gaze direction of the first user in the first video frame;
   generating, via the processor and using the second video frame, a modified video frame that represents the first virtual representation from a perspective of a second virtual representation in the virtual environment; and
   causing, via the processor, the modified video frame to be displayed in the virtual environment, at a third compute device, and to a second user associated with the second virtual representation.

2. The method of claim 1, wherein the second compute device is configured to (1) display an object for the first user to view, and (2) capture at least one of an image or a video that includes the at least one eye of the first user, the eye data based on the at least one of the image or the video.

3. The method of claim 1, wherein the second compute device is configured to determine a size of at least one display of the second compute device, the eye data further based on the size of the at least one display.

4. The method of claim 1, wherein the comparing the gaze direction and the field of view to predict the target gaze direction for the first user includes determining that the gaze direction and the field of view at least partially overlap, a gaze direction of the first virtual representation in the modified video frame in a direction of the second virtual representation in the modified video frame.

5. The method of claim 1, wherein the comparing the gaze direction and the field of view to predict the target gaze direction for the first user includes determining that the gaze direction and the field of view do not at least partially overlap, a gaze direction of the first virtual representation in the modified video frame not in a direction of the second virtual representation in the modified video frame.

6. The method of claim 1, wherein:
the normalizing factor is determined based on (1) a field of view range of the first user relative to at least one display of the second compute device and (2) a field of view range of the field of view of the first virtual representation, and
the field of view range of the first user relative to the at least one display is determined based on (i) a distance between the first user and the at least one display and (ii) a size of the at least one display.

7. The method of claim 1, further comprising:
receiving, via the processor and prior to receiving the signal representing the first video frame of the first user, a plurality of images of the first user, each image from the plurality of images being an image of the first user taken at an associated angle from a plurality of different angles;
determining, via the processor, a location of the first virtual representation during the determining of the field of view of the first virtual representation;
determining, via the processor, a location of the second virtual representation during the determining of the field of view of the first virtual representation; and
determining, via the processor, a field of view of the second virtual representation during the determining of the field of view of the first virtual representation, the modified video frame generated based on representations of at least one image from the plurality of images, the field of view of the first virtual representation, the location of the second virtual representation, the location of the second virtual representation, and the field of view of the second virtual representation.

8. The method of claim 1, further comprising:
causing (1) the eye data and (2) database data that includes gaze direction perception models and experimental results, to be input into at least one machine learning model to generate an output; and
determining that the output indicates that the eye data is sufficient to perform gaze direction correction for the first user.

9. The method of claim 1, wherein the eye data associated with the at least one eye of the first user is a first eye data, the normalizing factor is a first normalizing factor, the modified video frame is a first modified video frame, the method further comprising:
receiving, via the processor and from the third compute device, a signal representing second eye data associated with at least one eye of the second user;
determining, via the processor, that the second eye data is sufficient to perform gaze direction correction for the second user;
sending, via the processor and to the third compute device, a signal indicating that the second eye data is sufficient to perform the gaze direction correction;
receiving, via the processor and from the third compute device, a signal representing a third video frame of the second user;
predicting, via the processor and using the second eye data, a gaze direction of the second user in the third video frame;
determining, via the processor, a field of view of the second virtual representation;

comparing, via the processor, the gaze direction of the second user and the field of view of the second virtual representation, to predict a target gaze direction for the second user;
inputting, via the processor, the third video frame, the gaze direction of the second user, the target gaze direction, and a second normalizing factor into the processing pipeline to generate a fourth video frame, a gaze direction of the second virtual representation in the fourth video frame being different than the gaze direction of the second user in the third video frame;
generating, via the processor and using the fourth video frame, a second modified video frame that represents the second virtual representation from the perspective of the first virtual representation; and
causing, via the processor, the second modified video frame to be displayed in the virtual environment, at the second device, and to the first user.

10. The method of claim 1, wherein the modified video frame is a first modified video frame, the method further comprising:
generating, via the processor and using the second video frame, a second modified video frame that represents the first virtual representation from a perspective of a third virtual representation in the virtual environment different than the second virtual representation; and
causing, via the processor, the second modified video frame to be displayed in the virtual environment, at a fourth compute device, and to a third user associated with the third virtual representation.

11. The method of claim 1, wherein the first compute device is remote from the second compute device and the third compute device, and the second compute device is remote from the first compute device and the third compute device.

12. An apparatus, comprising:
a memory; and
a processor operatively coupled to the memory, the processor configured to:
receive, at a first compute device and from a second compute device, a signal representing a first video frame of a first user captured at a first time;
estimate a first gaze direction of the first user in the first video frame;
determine a first field of view of a first virtual representation of the first user in a virtual environment, the first virtual representation based on an appearance of the first user, the first field of view including a second virtual representation included in the virtual environment;
generate a second video frame that shows the first virtual representation looking at the second virtual representation; and
send, at a second time subsequent to the first time, the second video frame to a third compute device to cause the third compute device to display the second video frame within the virtual environment.

13. The apparatus of claim 12, wherein the processor is further configured to:
receive, at the first compute device and from the second compute device, a signal representing a third video frame of the first user captured at a third time;
estimate a second gaze direction of the first user in the second video frame;
determine a second field of view of the first virtual representation in the virtual environment, the second field of view including a third virtual representation and not the second virtual representation;

generate a fourth video frame that shows the first virtual representation looking at the third virtual representation and not the second virtual representation; and send, at a fourth time subsequent to the third time, the fourth video frame to the third compute device to cause the third compute device to display the fourth video frame within the virtual environment.

14. The apparatus of claim 13, wherein the processor is further configured to:

receive, from the second compute device, a signal representing a fifth video frame of the first user at a fifth time;

predict a third gaze direction of the first user in the fifth video frame;

determine a third field of view of the first virtual representation in the virtual environment, the third field of view including a virtual object that is not a virtual representation of a user;

generate a sixth video frame that shows the first virtual representation looking at the virtual object; and send, at a sixth time after the fifth time, the sixth video frame to the third compute device to cause the third compute device to display the sixth video frame within the virtual environment.

15. The apparatus of claim 13, wherein the processor is further configured to:

generate a fifth video frame that shows the first virtual representation looking at the second virtual representation;

send, at the first time, the fifth video frame to the second compute device to cause the second compute device to display the fifth video frame;

generate a sixth video frame that shows the first virtual representation looking at the third virtual representation; and send, at the second time, the sixth video frame to the second compute device to cause the second compute device to display the sixth video frame.

16. The apparatus of claim 13, wherein the processor is further configured to:

receive a first set of eye data captured by the second compute device while eyes of the first user viewed an object on a display of the second compute device while the object was at a first location;

determine that the first set of eye data is not sufficient to perform gaze direction correction for the first virtual representation;

send a signal to the second compute device indicating that the first set of eye data is not sufficient to perform gaze direction correction for the first virtual representation;

receive a second set of eye data captured by the second compute device while eyes of the first user viewed the object on the display of the second compute device and while the object was at a second location different than the first location;

determine that the first set of eye data and the second set of eye data are collectively sufficient to perform gaze direction correction for the first virtual representation; and send a signal to the second compute device indicating that the first set of eye data and the set of eye data are sufficient to perform gaze direction correction for the first virtual representation.

17. A non-transitory, processor-readable medium storing code representing instructions executable by a processor, the code comprising code to cause the processor to:

receive a video stream of a user, each video frame from the video stream including a depiction of a gaze of the user; and for each video frame from the video stream:

determine, based on an estimated gaze direction of the gaze of the user in that video frame, a field of view for a virtual representation associated with the user in a virtual environment;

generate an updated video frame including a modified gaze direction of the user different from the gaze direction of the user; and cause the updated video frame to be displayed.

18. The non-transitory processor-readable medium of claim 17, wherein the code further comprises code to cause the processor to:

receive a representation of eye data of the user, the representation generated using at least one of (1) a plurality of images of the user or (2) a video of the user, the estimated gaze direction of the gaze of the user being based on the eye data of the user.

19. The non-transitory processor-readable medium of claim 17, wherein the video stream is a first video stream, the user is a first user, the virtual representation is a first virtual representation associated with the first user, and the code further comprises code to cause the processor to:

receive a second video stream of a second user, each video frame from the second video stream including a depiction of a gaze of the second user; and for each video frame from the second video stream:

determine, substantially in real time as that video frame is received, an estimated gaze direction of the gaze of the second user in that video frame;

determine a field of view for a second virtual representation associated with the second user;

generate, based on the field of view for the second virtual representation and the estimated gaze direction of the gaze of the second user, an updated video frame including a modified gaze direction of the second user different than the gaze direction of the gaze of the second user; and cause the updated video frame to be displayed.

20. The non-transitory processor-readable medium of claim 17, wherein the virtual environment is an emulation of a virtual three-dimensional space.

* * * * *